United States Patent
Shapira et al.

(10) Patent No.: US 9,659,100 B2
(45) Date of Patent: May 23, 2017

(54) SEARCHING AND ACCESSING SOFTWARE APPLICATION FUNCTIONALITY USING CONCEPTS

(71) Applicant: Quixey, Inc., Mountain View, CA (US)

(72) Inventors: Liron Shapira, Mountain View, CA (US); Eric J. Glover, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 319 days.

(21) Appl. No.: 14/588,195

(22) Filed: Dec. 31, 2014

(65) Prior Publication Data

US 2015/0242462 A1   Aug. 27, 2015

Related U.S. Application Data

(60) Provisional application No. 61/943,105, filed on Feb. 21, 2014.

(51) Int. Cl.
*G06F 17/30* (2006.01)
*G06F 3/0484* (2013.01)
(Continued)

(52) U.S. Cl.
CPC ...... *G06F 17/3087* (2013.01); *G06F 3/04842* (2013.01); *G06F 8/61* (2013.01); *G06F 17/3053* (2013.01); *G06F 17/30241* (2013.01); *G06F 17/30424* (2013.01); *G06F 17/30864* (2013.01); *G06F 17/30867* (2013.01);
(Continued)

(58) Field of Classification Search
USPC .................................... 707/736, 769
See application file for complete search history.

(56) References Cited

U.S. PATENT DOCUMENTS 8,099,332 B2   1/2012   Lemay et al.
8,661,033 B2   2/2014   Leppert et al.
(Continued)

OTHER PUBLICATIONS

App Indexing: <https://web.archive.org/web/20140225132807/https://developers.google.com/app-indexing/webmasters/>, Dec. 4, 2013.
(Continued)

*Primary Examiner* — Hung T Vy
(74) *Attorney, Agent, or Firm* — Harness, Dickey & Pierce, P.L.C.

(57) ABSTRACT

A method includes selecting function records by a computing device. Each function record includes an application access mechanism, application state information, and a concept name. The method also includes aggregating the application state information included in the selected function records and generating a new function record that includes new application state information comprising the aggregated application state information. The method also includes generating a new application access mechanism for the new function record that is different than the application access mechanisms included in the selected function records, receiving a search query from a user device, and identifying the new function record using the search query. The method also includes selecting the new application access mechanism from the new function record and transmitting the new application access mechanism to the user device.

20 Claims, 14 Drawing Sheets

(51) Int. Cl.
  *G06F 9/445* (2006.01)
  *H04L 29/08* (2006.01)
  *G06Q 10/06* (2012.01)
  *H04W 4/02* (2009.01)
  *H04W 4/20* (2009.01)
  *G06Q 30/02* (2012.01)

(52) U.S. Cl.
  CPC ..... *G06F 17/30882* (2013.01); *G06Q 10/067* (2013.01); *G06Q 30/0282* (2013.01); *H04L 67/10* (2013.01); *H04W 4/022* (2013.01); *H04W 4/20* (2013.01)

(56) References Cited

U.S. PATENT DOCUMENTS

| | | |
|---|---|---|
| 2006/0287985 A1 | 12/2006 | Castro et al. |
| 2006/0294063 A1 | 12/2006 | Ali et al. |
| 2008/0009268 A1 | 1/2008 | Ramer et al. |
| 2010/0306191 A1 | 12/2010 | LeBeau et al. |
| 2011/0072001 A1 | 3/2011 | Basu et al. |
| 2011/0209143 A1 | 8/2011 | Ierullo |
| 2011/0307833 A1 | 12/2011 | Dale et al. |
| 2012/0124062 A1 | 5/2012 | Macbeth et al. |
| 2012/0284247 A1 | 11/2012 | Jiang et al. |
| 2012/0316955 A1 | 12/2012 | Panguluri et al. |
| 2012/0323898 A1 | 12/2012 | Kumar et al. |
| 2013/0132896 A1 | 5/2013 | Lee et al. |
| 2013/0268673 A1 | 10/2013 | Graham-Cumming |
| 2013/0290321 A1 | 10/2013 | Shapira et al. |
| 2013/0290344 A1 | 10/2013 | Glover et al. |
| 2013/0304729 A1 | 11/2013 | Jiang et al. |
| 2013/0325892 A1 | 12/2013 | Edwards et al. |
| 2014/0006409 A1 | 1/2014 | Prosnitz et al. |
| 2014/0019442 A1 | 1/2014 | Mahaniok et al. |
| 2014/0052683 A1* | 2/2014 | Kirkham ............ G06Q 30/0631 706/46 |
| 2014/0067846 A1 | 3/2014 | Edwards et al. |
| 2014/0172840 A1 | 6/2014 | Kumar et al. |
| 2014/0201179 A1 | 7/2014 | Chang et al. |
| 2014/0359598 A1 | 12/2014 | Oliver et al. |
| 2014/0365462 A1 | 12/2014 | Chang |
| 2015/0052021 A1* | 2/2015 | Elias ................. G06Q 30/0627 705/26.63 |

OTHER PUBLICATIONS

App Indexing Technical Details: <https://web.archive.org/web/20140210182226/https://developers.google.com/app-indexing/webmasters/details>, Feb. 1, 2014.
Indexing Apps Just Like Websites: <http://googlewebmastercentral.blogspot.com/2013/10/indexing-apps-just-like-websites.html>, Oct. 31, 2013.
Google Search Now Discovers Content Within Android Apps: http://searchengineland.com/google-search-now-discovers-content-within-android-apps-178960, Dec. 4, 2013.
Google's Search Results Can Deep-Link To Your Android Apps: <http://techcrunch.com/2013/10/31/android-4-4-kitkat-app-indexing/>, Oct. 31, 2013.
Google Testing SERP With Up To 16 Product Listing ADS: http://www.rimmkaufman.com/blog/google-testing-serp-with16-product-listing-ads/16072013 accessed on Sep. 2, 2014.
Secrets of the 7-Result SERP: http://moz.com/blog/secrets-of-the-7-result-serp, accessed on Sep. 2, 2014.
SERPs: A Primer: http://www.goinflow.com/serps-primer/, accessed on Sep. 2, 2014.
Ask.com SERP: http://www.ask.com/web?qq=katy+perry, accessed on Sep. 2, 2014.
Bing.com SERP: http://www.bing.com/search?q=katy+perry, accessed on Sep. 2, 2014.
Google.com SERP: https://www.google.com/?#q=katy+perry, accessed on Sep. 2, 2014.
PCT International Preliminary Report on Patentability dated Sep. 1, 2016 for PCT/US2015/016866, 6 pages.
U.S. Appl. No. 14/572,249, filed Dec. 16, 2014, Julia Lipton.
U.S. Appl. No. 14/586,104, filed Dec. 30, 2014, Eric Glover.
U.S. Appl. No. 14/586,250, filed Dec. 30, 2014, Eric Glover.
U.S. Appl. No. 14/588,219, filed Dec. 31, 2014, Liron Shapira.
U.S. Appl. No. 14/588,268, filed Dec. 31, 2014, Liron Shapira.
International Search Report and Written Opinion for related WO Application No. PCT/US2015/016866, dated May 26, 2015.

* cited by examiner

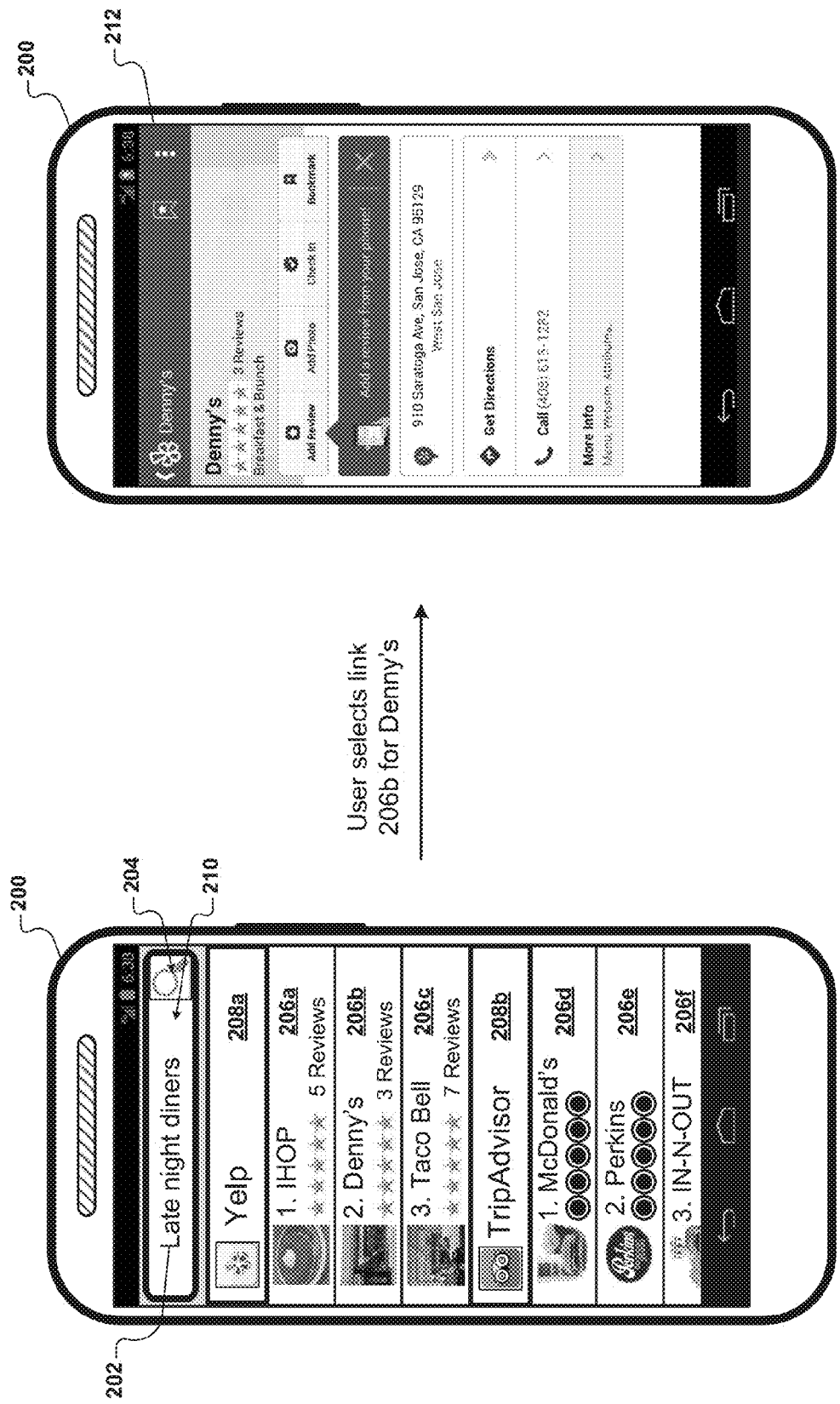

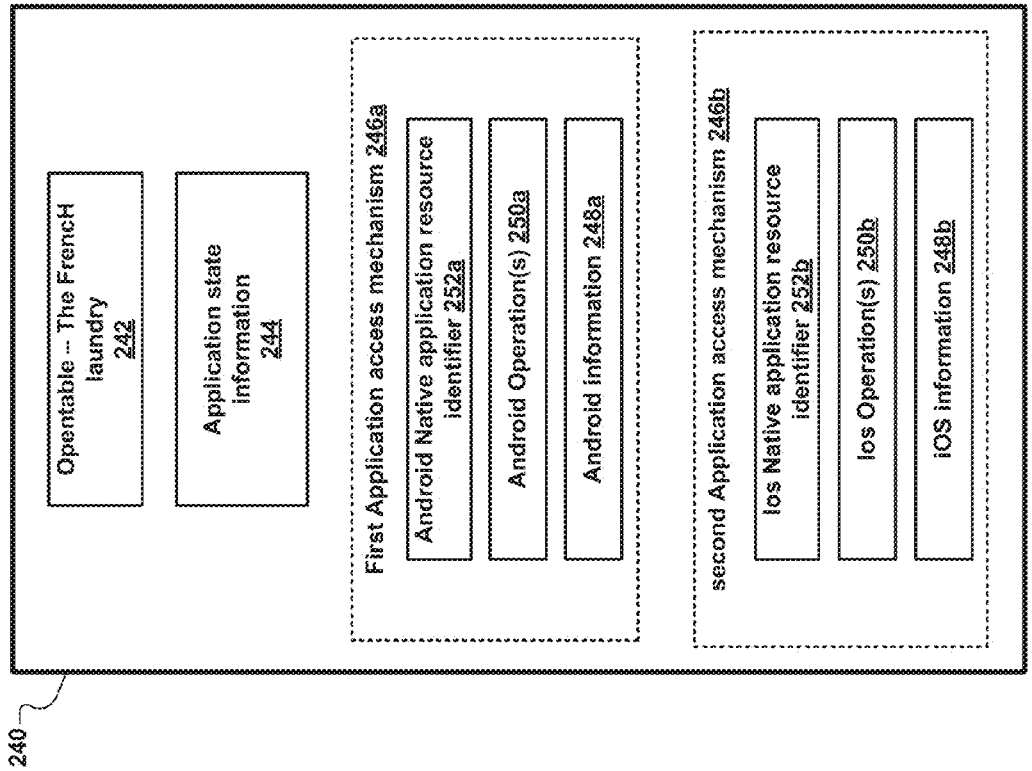
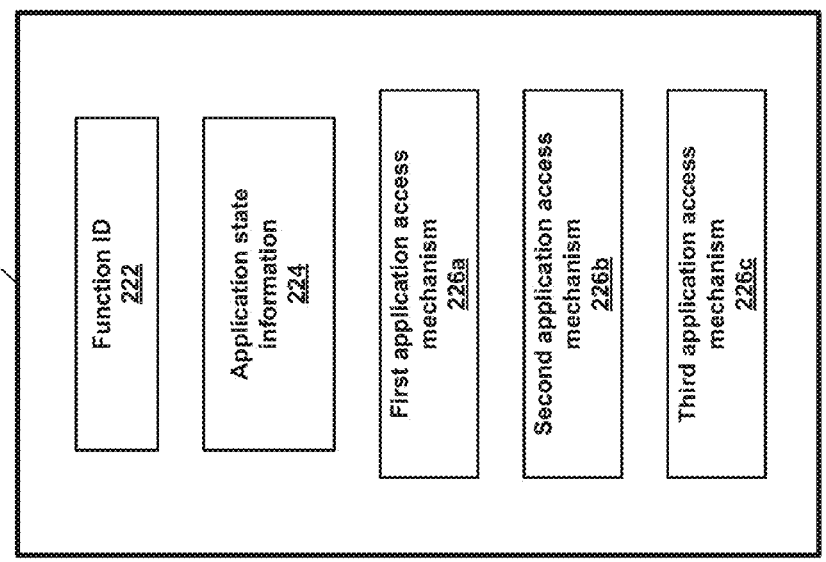
FIG. 8B
FIG. 8A

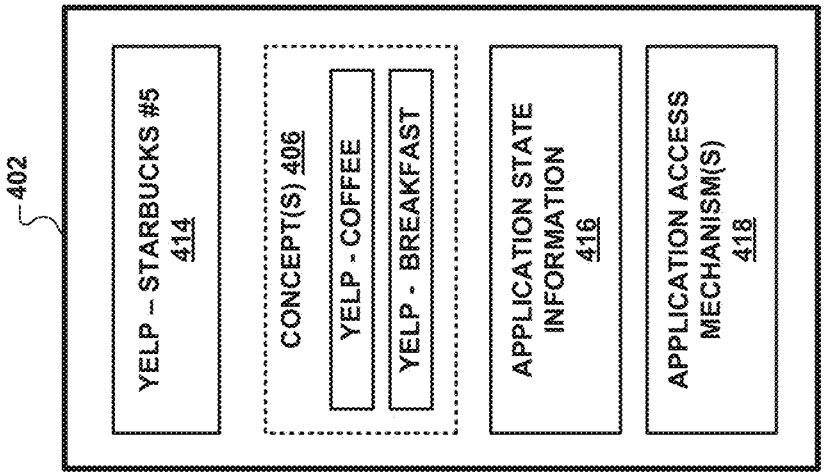

SEARCHING AND ACCESSING SOFTWARE APPLICATION FUNCTIONALITY USING CONCEPTS

CROSS-REFERENCE TO RELATED APPLICATION

This application claims priority under 35 U.S.C. §119(e) to U.S. Provisional Application 61/943,105, filed Feb. 21, 2014, which is hereby incorporated by reference in its entirety.

TECHNICAL FIELD

This disclosure generally relates to the field of search, and more particularly to techniques for generating search results that correspond to states within software applications.

BACKGROUND

In recent years, the use of computers, smartphones, and other Internet-connected computing devices has grown significantly. Correspondingly, the number of software applications available for such computing devices has also grown. Today, many diverse software applications can be accessed on a number of different computing devices, including, but not limited to, smartphones, personal computers, automobiles, and televisions. These software applications can include business driven applications, games, educational applications, news applications, shopping applications, messaging applications, media streaming applications, and social networking applications, as some examples. Because of the large number of software applications available today and the wide range of functionality they provide, computing device users often require the ability to search for and access specific software application functionality.

SUMMARY

One aspect of the disclosure provides a method that includes selecting function records. Each function record includes an application access mechanism (AAM), application state information (ASI), and a concept name. The AAM references a native application and indicates one or more operations for the native application to perform. The ASI describes a state of the native application after the native application has performed the one or more operations. The concept name describes a concept associated with the ASI. Selecting the function records includes selecting function records that have the same concept name. The method further includes aggregating the ASI included in the selected function records, generating a new function record that includes new ASI including the aggregated ASI, and generating a new AAM for the new function record that is different than the AAMs included in the selected function records. The method also includes receiving a search query from a user device, identifying the new function record using the search query, selecting the new AAM from the new function record, and transmitting the new AAM to the user device.

Implementations of the disclosure may include one or more of the following optional features. In some implementations, identifying the new function record using the search query may include identifying the new function record based on matches between terms of the search query and terms of the aggregated application state information included in the new function record.

In some examples, the method may further include storing the new function record in a data store that includes a plurality of function records including the selected function records. In these examples, identifying the new function record using the search query may include performing a search of the data store using the search query. In some examples, the method may further include identifying one or more of the plurality of function records using the search query, selecting one or more application access mechanisms from the identified one or more of the plurality of function records, and transmitting the selected one or more application access mechanisms to the user device along with the new application access mechanism.

In some examples, the new application access mechanism may reference a native application and indicate one or more operations for the native application to perform. In these examples, performance of the one or more operations may cause the native application to perform a search within the native application using the concept name.

In some examples, the new application access mechanism may reference a native application and indicate one or more operations for the native application to perform. In these examples, performance of the one or more operations may cause the native application to access a category within the native application that corresponds to the concept name.

In some examples, the new application access mechanism may reference a native application and indicate one or more operations for the native application to perform. In these examples, the application access mechanisms included in the selected function records may reference different native applications. Also in these examples, the native application referenced by the new application access mechanism may include one of a native application referenced by the application access mechanisms included in the selected function records and another native application.

In some examples, the new application access mechanism may reference a native application and indicate one or more operations for the native application to perform. In these examples, the application access mechanisms included in the selected function records may each reference the same native application. Also in these examples, the native application referenced by the new application access mechanism may include the same native application.

In some examples, each of the selected function records may further include location data that indicates a geographic area associated with the respective function record. In these examples, the method may further include aggregating the location data included in the selected function records, and generating new location data for the new function record. In these examples, the new location data may include the aggregated location data. In some examples, identifying the new function record using the search query may include identifying the new function record based on the aggregated location data included in the new function record.

Another aspect of the disclosure provides a system including one or more computing devices configured to select function records. Each function record includes an AAM, ASI, and a concept name. The AAM references a native application and indicates one or more operations for the native application to perform. The ASI describes a state of the native application after the native application has performed the one or more operations. The concept name describes a concept associated with the ASI. To select the function records, the one or more computing devices are configured to select function records that have the same concept name. The one or more computing devices are further configured to aggregate the ASI included in the selected function records, generate a new function record that includes new ASI including the aggregated ASI, and generate a new AAM for the new function record that is different than the AAMs included in the selected function records. The one or more computing devices are also configured to receive a search query from a user device, identify the new function record using the search query, select the new AAM from the new function record, and transmit the new AAM to the user device.

In some examples, the one or more computing devices may be further configured to store the new function record in a data store that includes a plurality of function records including the selected function records. In these examples, to identify the new function record using the search query, the one or more computing devices may be configured to perform a search of the data store using the search query. In some examples, the one or more computing devices may be further configured to identify one or more of the plurality of function records using the search query, select one or more application access mechanisms from the identified one or more of the plurality of function records, and transmit the selected one or more application access mechanisms to the user device along with the new application access mechanism.

In some examples, the new application access mechanism may reference a native application and indicate one or more operations for the native application to perform. In these examples, performance of the one or more operations may cause the native application to perform a search within the native application using the concept name.

In some examples, the new application access mechanism may reference a native application and indicate one or more operations for the native application to perform. In these examples, performance of the one or more operations may cause the native application to access a category within the native application that corresponds to the concept name.

In some examples, the new application access mechanism may reference a native application and indicate one or more operations for the native application to perform. In these examples, the application access mechanisms included in the selected function records may reference different native applications. Also in these examples, the native application referenced by the new application access mechanism may include one of a native application referenced by the application access mechanisms included in the selected function records and another native application.

In some examples, the new application access mechanism may reference a native application and indicate one or more operations for the native application to perform. In these examples, the application access mechanisms included in the selected function records may each reference the same native application. Also in these examples, the native application referenced by the new application access mechanism may include the same native application.

In some examples, each of the selected function records may further include location data that indicates a geographic area associated with the respective function record. In these examples, the one or more computing devices may be further configured to aggregate the location data included in the selected function records, and generate new location data for the new function record. Also in these examples, the new location data may include the aggregated location data. In some examples, to identify the new function record using the search query, the one or more computing devices may be configured to identify the new function record based on the aggregated location data included in the new function record.

Another aspect of the disclosure provides a non-transitory computer-readable storage medium including instructions that cause one or more computing devices to select function records. Each function record includes an AAM, ASI, and a concept name. The AAM references a native application and indicates one or more operations for the native application to perform. The ASI describes a state of the native application after the native application has performed the one or more operations. The concept name describes a concept associated with the ASI. The instructions that cause the one or more computing devices to select the function records include instructions that cause the one or more computing devices to select function records that have the same concept name. The instructions further cause the one or more computing devices to aggregate the ASI included in the selected function records, generate a new function record that includes new ASI including the aggregated ASI, and generate a new AAM for the new function record that is different than the AAMs included in the selected function records. The instructions also cause the one or more computing devices to receive a search query from a user device, identify the new function record using the search query, select the new AAM from the new function record, and transmit the new AAM to the user device.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

FIGS. 7A and 7B are schematic views of example graphical user interfaces (GUIs) that may be generated on a user device according to the present disclosure.

FIGS. 8A and 8B are schematic views of example function records that include multiple native application access mechanisms.

FIGS. 13A and 13B are schematic views of example function records that include concept fields.

DETAILED DESCRIPTION

Figure 1:
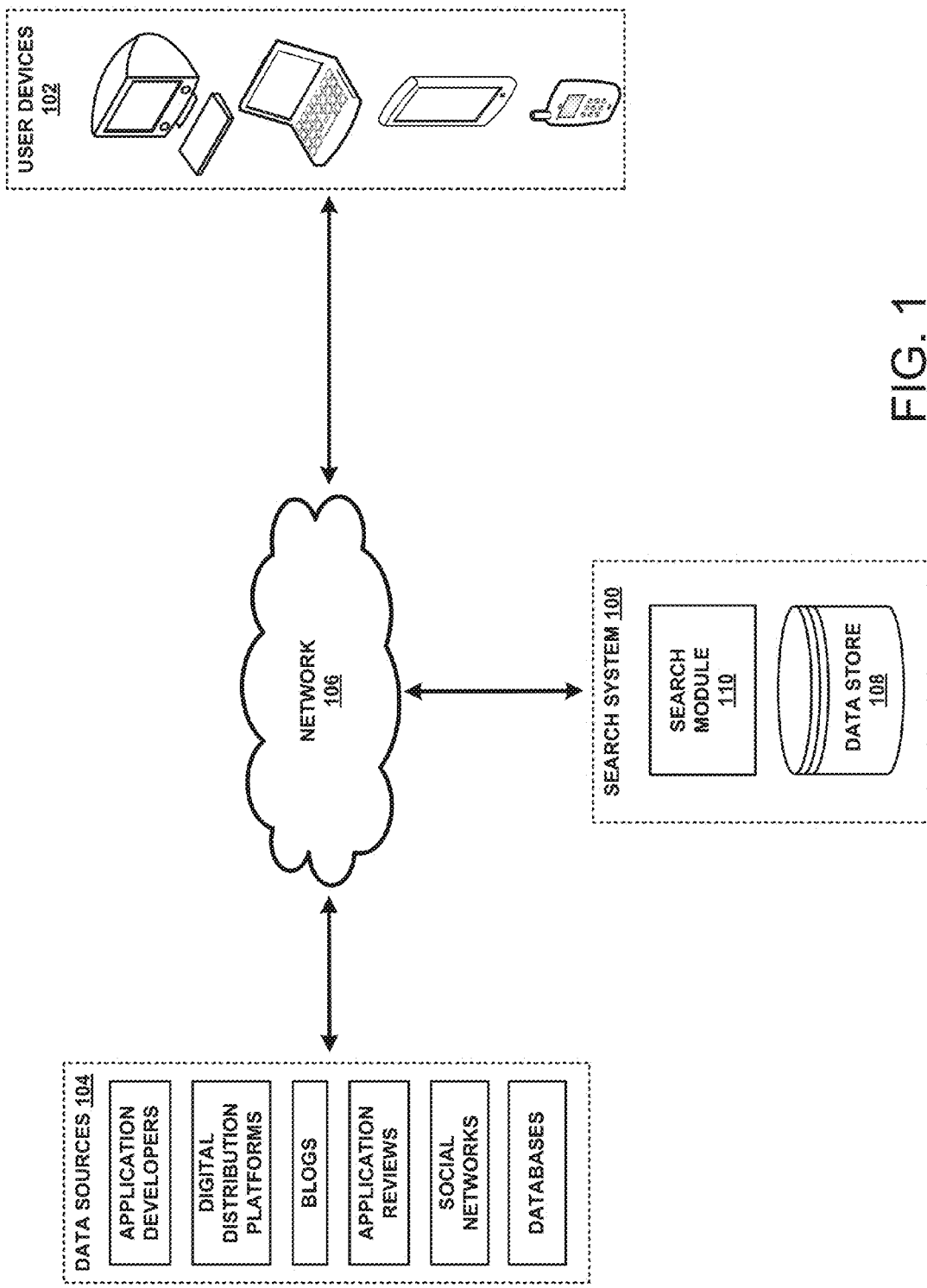
FIG. 1 is a schematic view of an example environment including a search system.

A search system of the present disclosure receives a search query from a user device and generates search results in response to the received search query. The search system transmits the search results to the user device that generated the search query. The search results include a list of application access mechanisms (AAMs) that may be selected by a user. An AAM may be a string that includes a reference to a native application and indicates one or more operations for a user device to perform. In response to selection of an AAM on a user device, the user device may launch the native application referenced in the AAM and perform the one or more operations indicated in the AAM.

Native applications can perform a variety of different functions for a user. For example, a restaurant reservation application can make reservations for restaurants. As another example, an internet media player application can stream media (e.g., a song or movie) from the Internet. In some examples, a single native application can perform more than one function. For example, a restaurant reservation application may also allow a user to retrieve information about a restaurant and read user reviews for the restaurant in addition to making reservations. As another example, an internet media player application may also allow a user to perform searches for digital media, purchase digital media, and generate media playlists.

An AAM includes data that a user device can use to access functionality provided by a native application. For example, an AAM can include data that causes a user device to launch a native application and perform a function associated with the native application. Performance of a function according to the AAM may set the native application into a specified state. Accordingly, the process of launching a native application and performing a function according to an AAM may be referred to herein as launching the native application and setting the native application into a state that is specified by the AAM. In one example, an AAM for a restaurant reservation application can include data that causes a user device to launch the restaurant reservation application and make a reservation at a restaurant. In this example, the restaurant reservation application may be set in a state that displays reservation information to a user, such as a reservation time, a description of the restaurant, and user reviews. In another example, an AAM for an internet media player application can include data that causes a user device to launch the internet media player application and stream media from the Internet. In this example, the internet media player application may be set in a state that displays information regarding the media (e.g., music) being streamed, such as a song name, an artist, or an album name.

AAMs may have various different formats and content. The format and content of an AAM may depend on the native application with which the AAM is associated and the operations that are to be performed by the native application in response to selection of the AAM. For example, an AAM for an internet music player application may differ from an AAM for a shopping application. An AAM for an internet music player application may include references to musical artists, songs, and albums, for example. The AAM for the internet music player application may also reference operations, such as randomizing a list of songs and playing a song or album. An AAM for a shopping application may include references to different products that are for sale. The AAM for the shopping application may also include references to one or more operations, such as adding products to a shopping cart and proceeding to a checkout.

Figure 2:
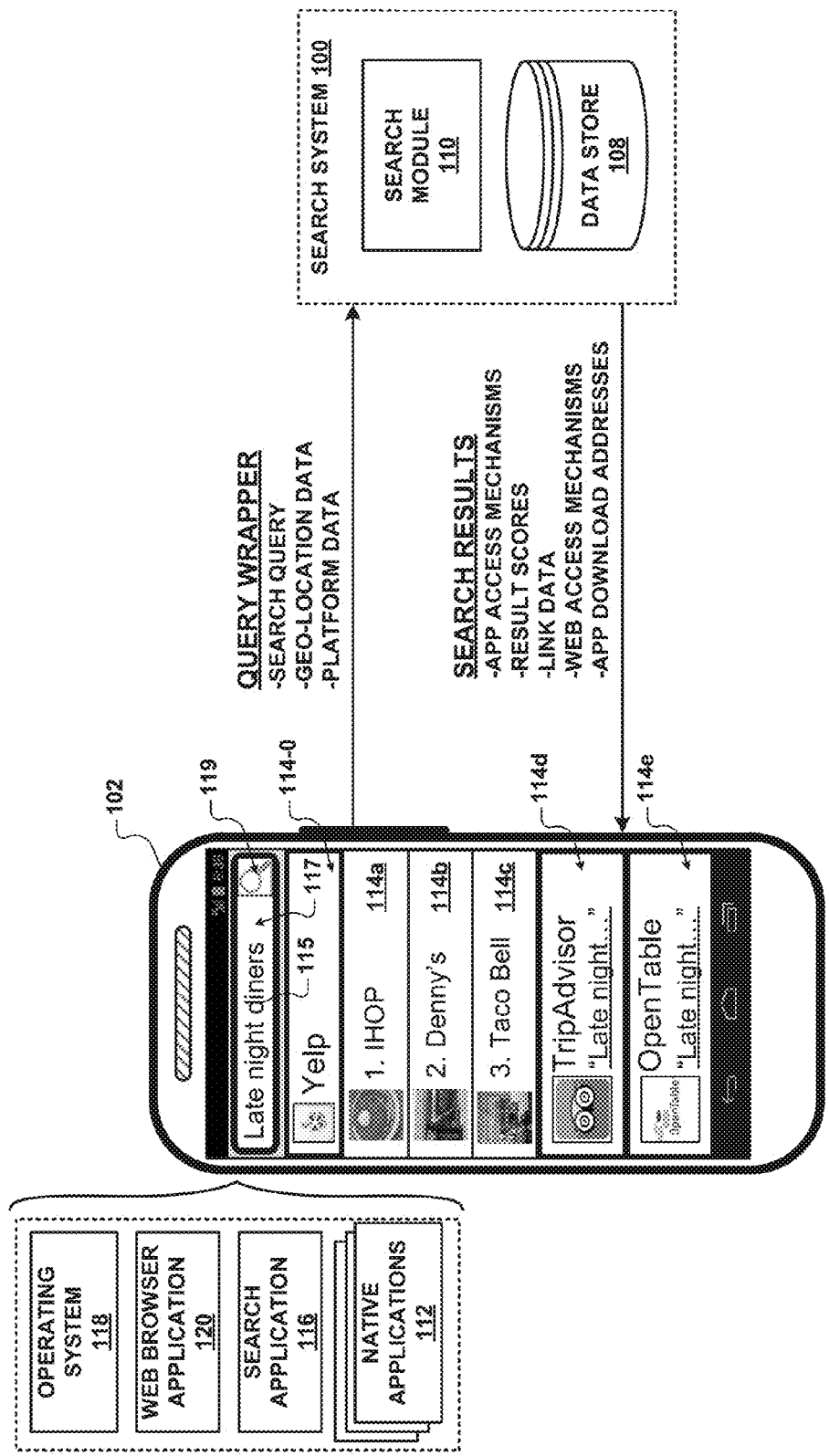
FIG. 2 is a schematic view of an example user device in communication with a search system.
Figure 12:
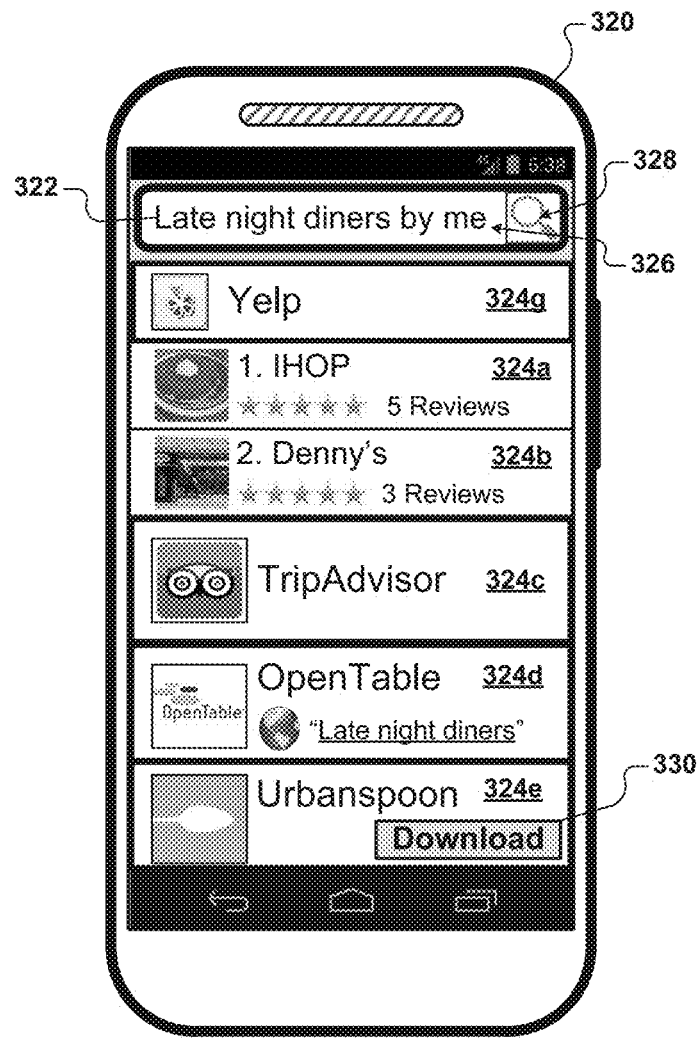
FIG. 12 is a schematic view of an example GUI that includes a variety of different user selectable links.

The search system transmits additional data in the search results along with the AAMs. For example, the search system may transmit data (e.g., text and/or images) which may be used by the user device to generate user selectable links (or "links") in the search results. A link may include text and/or images that a user may select (e.g., touch) via a user interface of the user device. Each user selectable link may be associated with an AAM such that when a user selects a link, the user device launches the native application referenced in the AAM and performs the one or more operations indicated in the AAM. The text and/or images of a link displayed to a user may indicate the operations that will be performed in response to selection of the link. For example, if the link is to a song in a music playing application, the text and/or images may identify the music playing application that will be launched by the user device and the song that will be played by the music playing application when the user selects the link. Example links are illustrated in FIGS. 2, 7A, and 12.

A user may select a link to cause the user device to launch the native application identified in the link and perform one or more operations according to the AAM associated with the link. Put another way, when a user selects a link, the user device launches a native application and sets the native application into a state defined by the AAM associated with the link. In general, a state of a native application may refer to the operations and/or the resulting outcome of the native application in response to selection of a link. A state of a native application may also be referred to herein as an "application state."

An application state specified by an AAM may depend on the functionality provided by the native application. For example, if a native application is configured to retrieve and display information from the Internet, the native application can be set into a state in which the native application retrieves information from the Internet and displays information to the user. In another example, if a native application is configured to play media from the Internet (e.g., music and/or video), the native application can be set into a state in which the native application is playing a song or a movie from the Internet. In another example, if a native application is configured to make restaurant reservations, the native application can be set into a state in which the native application displays available restaurant reservations to the user.

The search system includes a data store that the search system uses to generate the search results. The data store includes one or more different function records (e.g., the function record 150 of FIG. 4A). Each function record may include data related to a function of a native application and/or the state of the native application resulting from performance of the function. As described herein, a function record may include a function identifier (ID), application state information (ASI), and an AAM.

An AAM included in a function record includes data that causes a user device to launch a native application and perform a function associated with the native application. For example, an AAM included in a function record may be a string that includes a reference to a native application and indicates one or more operations for a user device (e.g., the native application) to perform. An AAM may include an application resource identifier (ARI) and/or one or more operations for the user device to perform. An ARI may be a string having an application specific scheme in some examples. The ARI may include a reference to a native application and indicate one or more operations for the user device (e.g., the native application) to perform. For example, the ARI may include a reference to a native application, a domain name, and a path to be used by the native application to retrieve and display information to the user.

In some examples, the AAM may include operations for the user device to perform in addition to the operation(s) indicated in the ARI. For example, a search application on the user device, an operating system (OS) of the user device, and/or a native application on the user device may perform the operations included in the AAM. In some examples, the operations may be included in a script. Examples of operations may include, but are not limited to, launching a native application, creating and sending a search request to an application server, setting a current geographic location in a native application, making a restaurant reservation, sending a text message, and adding an appointment to a calendar.

In some examples, an AAM may not include an ARI. Instead, the AAM can include one or more operations that reference a native application and indicate one or more operations for the user device to perform. The one or more operations may include instructions for at least one of the search application, the OS, and/or a native application on the user device. In response to selection of the AAM, the user device may perform the operations included in the AAM.

A function ID included in a function record may be a string that uniquely identifies the function record among the other function records in the data store. In some examples, the function ID may describe a function and/or an application state in human readable form. For example, the function ID may be a human readable string that describes a function performed according to the AAM and/or an application state resulting from performance of the function according to the AAM. In a more specific example, a function ID for an internet music player application may include the name of the internet music player application along with the name of the song that will be played when the internet music player application is set into the state defined by the AAM included in the function record.

A function record includes ASI. The ASI includes data that describes an application state into which a native application is set according to the AAM in the function record. In some examples, the ASI may include data that describes the function performed according to the AAM included in the function record. The ASI can include text, numbers, and symbols that describe the application state. The types of data included in the ASI may depend on the type of information associated with the application state and the functionality specified by the AAM.

In some examples, the ASI may include data that may be presented to the user when the native application is in the application state defined by the AAM. For example, a function record associated with a shopping application may include ASI that describes products (e.g., names and prices) that are shown when the shopping application is set into the application state defined by the AAM of the function record. As another example, a function record associated with a music player application may include ASI that describes a song (e.g., name and artist) that is played when the music player application is set into the application state defined by the AAM of the function record.

The ASI included in a function record may be generated in a variety of different ways. In one example, data to be included in the ASI may be retrieved via partnerships with database owners and developers of native applications. For example, the data may be automatically retrieved from online databases that include, but are not limited to, data related to movies, television programs, music, and restaurants. In some examples, some data included in the ASI may be manually generated by a human operator. The data included in the ASI may be updated over time so that the search system provides up-to-date results.

The search system generates search results including a list of AAMs that are included in selected function records. Initially, the search system analyzes the search query received from a user device. The search system then identifies a set of function records based on the received search query. For example, the search system may identify the set of function records based on one or more matches (e.g., text matches) between one or more terms of the search query and one or more terms of the ASI included in the identified function records.

The search system processes (e.g., scores) the identified set of function records. For example, the search system may determine how well the function records match the received search query. The search system may then select the AAMs from the function records that best match the received search query. The search system transmits search results including the selected AAMs to the user device that generated the search query. The search system may also transmit additional data along with the AAMs. For example, the search system may transmit data (e.g., text and/or images) to be included in user selectable links.

In some implementations, a function record (e.g., the function record 220 of FIG. 8A) may include multiple different AAMs. For example, the different AAMs may be associated with different editions of a native application. A native application edition (hereinafter, "application edition") refers to a particular implementation or variation of a native application. For example, an application edition may refer to a version of a native application, such as a version 1.0 of a native application or a version 2.0 of a native application (e.g., a free version, or a paid version). In another example, an application edition may refer to an implementation of a native application for a specific platform, such as a specific OS.

The different AAMs included in the function record may cause the corresponding application editions to launch and perform similar functions. Accordingly, the different AAMs included in the function record may cause the corresponding application editions to be set into similar application states. In one example, if the different AAMs reference different editions of an information retrieval application, the different AAMs may cause the corresponding application editions to retrieve similar information. In another example, if the different AAMs reference different editions of an internet music player application, the different AAMs may cause the corresponding application editions to play the same song.

In a specific example, a function record for a native application that retrieves restaurant information may include multiple different AAMs for multiple different application editions. Assuming the function record is associated with a specific Mexican restaurant, the AAMs for the different application editions may cause each application edition to retrieve information for the same specific Mexican restaurant. For example, a first AAM may cause a first application edition (e.g., on a first OS) to retrieve information for the specific Mexican restaurant. A second AAM may cause a second application edition (e.g., on a second OS) to retrieve information for the specific Mexican restaurant.

During some searches, the search system may identify one or more function records that include multiple AAMs. In these scenarios, the search system may process (e.g., score) the identified set of function records in the manner described above. For each identified function record including multiple AAMs, the search system may select which of the AAMs to transmit to the user device. In some examples, the search system may transmit each of the multiple AAMs of the identified function record to the user device so that the user device may determine which AAM to use. In other examples, the search system may determine which of the multiple AAMs to transmit to the user device based on information included in a query wrapper received from the user device. For example, the search system may select and transmit one or more of the AAMs that are likely to be compatible with the user device, e.g., based on the OS version of the user device.

In some implementations, a function record (e.g., the function record 260 of FIG. 9) may include a web access mechanism (WAM). The WAM may be a resource identifier that can be processed by a wide variety of user devices running different operating systems. In some examples, the WAM may include a uniform resource locator (URL) (i.e., a web address) used with the hypertext transfer protocol (HTTP). For example, the WAM may be a URL that is optimized for a desktop website (e.g., a so-called "full" site) or a mobile device website.

The WAM (e.g., a URL) included in a function record may be used by a web browser to access a web resource that includes similar information and/or performs similar functions as would be performed by a native application that receives an AAM of the function record. In one specific example, the WAM of a function record may direct the web browser of a user device to a web version of the native application referenced in the AAMs of the function record. For example, if the AAMs included in a function record for a specific Mexican restaurant cause each application edition to retrieve information for the specific Mexican restaurant, the WAM may direct the web browser of a user device to a web page entry for the specific Mexican restaurant.

During some searches, the search system may identify one or more function records that include AAMs and a WAM. In these scenarios, the search system may process (e.g., score) the identified set of function records in the manner described above. For each identified function record including AAMs and a WAM, the search system may determine whether to transmit the WAM and the AAMs. In some examples, the search system may transmit the WAM and each of the multiple AAMs to the user device so that the user device can determine which of the access mechanisms to use. In other examples, the search system may determine whether any of the AAMs should be transmitted to the user device. If the search system determines that none of the AAMs is likely to be compatible with the user device, the search system can refrain from sending the AAMs to the user device. Instead, the search system may transmit the WAM to the user device. As described above, the user device may use a web browser to access the web resource identified in the WAM.

In some implementations of the search system, a function record (e.g., the function record 300 of FIG. 11) may include a quality score. The quality score may be a number used by the search system to generate a result score for a function record. For example, the quality score may be a record scoring feature input into one or more machine-learned models used to generate a result score, as described hereinafter.

The quality score may be determined based on metrics associated with a person, place, or thing described in the function record. For example, the quality score may be based on the popularity of a place described in the function record and/or ratings (e.g., user ratings) of the place described in the function record. In another example, if the function record describes a song, the quality score may be based on the popularity of the song described in the function record and/or ratings (e.g., user ratings) of the song described in the function record. The quality score may also be determined based on measurements associated with the function record. For example, the quality score may be determined based on data indicating how often the function record is retrieved during a search and how often access mechanisms (e.g., an AAM, a WAM, and/or an application download address) of the function record are selected by a user.

FIG. 1 is a functional block diagram illustrating an example environment including a search system 100 that communicates with user devices 102 and data sources 104 via a network 106. FIG. 2 shows an example user device 102 in communication with the search system 100 via the network 106 (not illustrated in FIG. 2). The search system 100 is configured to receive a search query from a user device 102 and perform a search for function records included in a data store 108 based on the search query. The function records include AAMs that can be used by a user device 102 to access different functions for a variety of different native applications (e.g., the native applications 112 of FIG. 2) installed on the user device 102. The search system 100 transmits search results including a list of AAMs to the user device 102 that generated the search query.

The user device 102 may generate user selectable links based on the received search results (e.g., the links 114*a*, 114*b* . . . . , 114*e* of FIG. 2). Each user selectable link displayed to the user may include an AAM. The user may select a link in the search results on the user device 102. In response to selection of a link, the user device 102 may launch the native application referenced by the AAM and perform the one or more operations indicated in the AAM.

A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

As described above, the search system 100 is configured to receive search queries from one or more user devices 102 via a network 106. A search query may include text, numbers, and/or symbols (e.g., punctuation) entered into the user device 102 by the user. For example, with reference to FIG. 2, the user may have entered a search query 115 into a search field (e.g., a search field) 117 of a search application 116 running on the user device 102. The user may have entered the search query 115 using a user interface such as, for example, a touchscreen keypad, a mechanical keypad, and/or via speech recognition. The user may have caused the user device 102 to transmit the search query 115 to the search system 100 by selecting (e.g., touching or clicking) a search button 119 of the search application 116. As described herein, in some examples, the search application 116 may be a native application dedicated to search, or a more general application, such as a web browser application.

In some examples, a user device 102 may transmit additional data along with the search query. The search query and the additional data may be referred to as a query wrapper. The query wrapper may include data associated with the search query, such as geo-location data (e.g., the location of the user device 102), platform data (e.g., a version of an OS 118 of the user device 102 as shown in FIG. 2, a device type, and a web-browser version), an identity of a user of the user device 102 (e.g., a username), partner specific data, and other data. The user device 102 transmits the query wrapper to the search system 100. The search system 100 can use the search query and/or the additional data included in the query wrapper to generate the search results.

The search system 100 performs a search for function records included in the data store 108 in response to the received search query. The search system 100 generates search results that include a list of AAMs selected from the function records identified during the search. In some examples, the search system 100 generates result scores for the selected AAMs. Each AAM may be associated with a result score that indicates the rank of the AAM relative to the other AAMs in the list of AAMs. The search system 100 may transmit the result scores to the user device 102 that generated the search query.

In some examples, the search system 100 may transmit additional data to the user device 102 along with the AAMs and result scores. For example, the search system 100 may transmit link data (e.g., text and/or images). Link data can refer to data that is to be included in user selectable links on the user device 102. The user device 102 displays the user selectable links to the user. Each user selectable link may be associated with an AAM included in the search results such that when a user selects a link, the user device 102 launches the native application referenced in the AAM and sets the native application into the state specified by the AAM. A user may select a link by touching (e.g., tapping) or clicking on the link.

In some examples described herein, the search system 100 may transmit one or more WAMs to the user device 102 along with AAMs. WAMs may include web addresses that are accessible via a web browser application 120 of the user device 102, as shown in FIG. 2. In examples where the search system 100 transmits one or more WAMs, the search system 100 may transmit data (e.g., text and/or images) to be included in user selectable links associated with the WAMs. When a user selects a link associated with a WAM, the user device 102 may launch the web browser application 120 and perform the function indicated in the WAM. The generation of search results including WAMs is described herein with respect to FIG. 9.

FIG. 2 shows an example list of search results that may be displayed to a user on a user device 102. The search results include links 114a, 114b, . . . , 114e (collectively, the "links 114"). Each of the links 114 includes link data. For example, each of the links 114 includes an image (e.g., an application icon) and text (e.g., application name) that describe the native application and the application state (e.g., "IHOP," "Denny's," and "Taco Bell" entries in the native application "YELP®" by Yelp, Inc. (hereinafter, "Yelp")). Each of the links 114 may be associated with an AAM such that when the user selects a link, the user device 102 launches the native application and sets the native application into a state that is specified by the AAM associated with the link. As described herein, the links 114 may be arranged for the user based on result scores associated with the AAMs. In some examples, as illustrated in FIG. 2, links for the same native application (e.g., Yelp) may be combined together in the search results displayed to the user. For example, as shown in FIG. 2, the Yelp links 114a, 114b, and 114c are grouped together under a Yelp header 114g. In other examples, links for different native applications may be mixed instead of grouped.

Referring back to FIG. 1, the search system 100 includes a data store 108 and a search module 110. The data store 108 includes one or more different function records, as described herein. Each function record may include data related to a function of a native application and/or the state of the native application resulting from performance of the function. A function record may include a function ID, ASI, and an AAM used to access functionality provided by a native application. The data store 108 may include one or more databases, indices (e.g., inverted indices), tables, files, or other data structures which may be used to implement the techniques of the present disclosure. The search module 110 receives a search query and generates search results based on the data included in the data store 108.

As described above, the search system 100 may communicate with the user devices 102 and the data sources 104 via the network 106. Examples of the user devices 102, the data sources 104, and the network 106 are now described in turn with reference to FIGS. 1-2.

User devices 102 can be any computing devices that are capable of providing search queries to the search system 100. User devices 102 include, but are not limited to, smart phones, tablet computers, laptop computers, and desktop computers. User devices 102 may also include other computing devices having other form factors, such as computing devices included in vehicles, gaming devices, televisions, or other appliances (e.g., networked home automation devices and home appliances).

The user devices 102 may use a variety of different operating systems. In an example where a user device 102 is a mobile device, the user device 102 may run an OS including, but not limited to, ANDROID® developed by Google Inc., IOS® developed by Apple Inc., or WINDOWS PHONE® developed by Microsoft Corporation. Accordingly, the OS 118 running on the user device 102 of FIG. 2 may include one of ANDROID®, IOS®, or WINDOWS PHONE®. In an example where a user device 102 is a laptop or desktop computing device, the user device 102 may run an OS including, but not limited to, MICROSOFT WINDOWS® developed by Microsoft Corporation, MAC OS® developed by Apple Inc., or LINUX® (LINUX® is the registered trademark of Linus Torvalds in the U.S. and other countries). User devices 102 may also access the search system 100 while running operating systems other than those operating systems described above, whether presently available or developed in the future.

User devices 102 can communicate with the search system 100 via the network 106. In some examples, a user device 102 may communicate with the search system 100 using a native application installed on the user device 102 (e.g., the search application 116). In general, a user device 102 may communicate with the search system 100 using any application that can transmit search queries to the search system 100. In some examples, a user device 102 may run an application that is dedicated to interfacing with the search system 100, such as an application dedicated to searches (e.g., the search application 116). In other examples, a user device 102 may communicate with the search system 100 using a more general application, such as a web-browser application. The application run by a user device 102 to communicate with the search system 100 may display a search field 117 on a graphical user interface (GUI) in which the user may enter search queries. The user may enter a search query using a touchscreen or physical keyboard, a speech-to-text program, or other form of user input.

In general, a search query may be a request for information retrieval (e.g., search results) from the search system 100. For example, a search query may be directed to retrieving a list of links to native application functionality or application states in examples where the search system 100 is configured to generate a list of AAMs as search results. A search query directed to retrieving a list of links to native applications may indicate a user's desire to access functionality of one or more native applications described by the search query.

A user device 102 may receive a set of search results from the search system 100 that are responsive to the search query transmitted to the search system 100. The user device 102 may be running a search application 116 including a GUI that displays the search results received from the search system 100. For example, the search application 116 used to transmit the search query to the search system 100 may also display the received search results to the user.

The GUI of the search application 116 running on the user device 102 may display the search results to the user in a variety of different ways, depending on what information is transmitted to the user device 102. In examples where the search results include a list of AAMs, the search system 100 may transmit the list of AAMs to the user device 102 along with additional data to be displayed in user selectable links. In some examples, the GUI may display the search results to the user as a list of user selectable links including text and images. The text and images in the links may include the native application names associated with the AAMs, text describing the AAMs, images associated with the native application referenced by the AAMs (e.g., application icons), and images associated with the application states (e.g., application screen images) defined by the AAMs.

In some examples, the GUI may display the search results as a list of links (e.g., the links 114 of FIG. 2) arranged under the search field (e.g., the search field 117 of FIG. 2) in which the user entered the search query. The user device 102 may arrange the links in order by result scores associated with the links. In other words, the user device 102 may arrange the links in order by the result scores associated with the AAMs included in the links. In some examples, the user device 102 may group the links together if the links are related to the same native application.

In some examples, user devices 102 may communicate with the search system 100 via a partner computing system (not illustrated). The partner computing system may be a computing system of a third party that may leverage the search functionality of the search system 100. The partner computing system may belong to a company or organization other than that which operates the search system 100. Example third parties which may leverage the functionality of the search system 100 may include, but are not limited to, internet search providers and wireless communications service providers. The user devices 102 may send search queries to the search system 100 and receive search results via the partner computing system. The partner computing system may provide a user interface to the user devices 102 in some examples and/or modify the search experience provided on the user devices 102.

FIG. 1 shows a plurality of data sources 104. The data sources 104 may be sources of data which the search system 100 may use to generate and update the data store 108. For example, the search system 100 may use the data to update one or more databases, indices, tables, files, or other data structures included in the data store 108. The search system 100 may generate new function records and update existing function records based on data retrieved from the data sources 104. Although not illustrated in FIG. 1, the search system 100 may include modules that generate new function records and update existing function records based on the data retrieved from the data sources 104. In some examples, some data included in the data store 108 may be manually generated by a human operator.

The data sources 104 may include a variety of different data providers. The data sources 104 may include data from application developers, such as application developers' websites and data feeds provided by developers. The data sources 104 may include operators of digital distribution platforms configured to distribute applications to user devices 102. The data sources 104 may also include other websites, such as websites that include web logs (i.e., blogs), application review websites, or other websites including data related to applications. Additionally, the data sources 104 may include social networking sites, such as "FACEBOOK®" by Facebook, Inc. (e.g., Facebook posts) and "TWITTER®" by Twitter, Inc. (e.g., text from tweets). The data sources 104 may also include online databases that include, but are not limited to, data related to movies, television programs, music, and restaurants. The data sources 104 may also include additional types of data sources in addition to the data sources described above. Different data sources may have their own content and update rate.

The search system 100 retrieves data from one or more of the data sources 104. The data retrieved from the data sources 104 can include any type of data related to application functionality and/or application states. The search system 100 generates function records based on the data retrieved from the data sources 104. In some examples, some data included in the function records (e.g., ASI) may be manually generated by a human operator. The data included in the function records may be updated over time so that the search system 100 provides up-to-date results.

As described above, the user devices 102, the search system 100, and the data sources 104 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In some implementations, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 3:
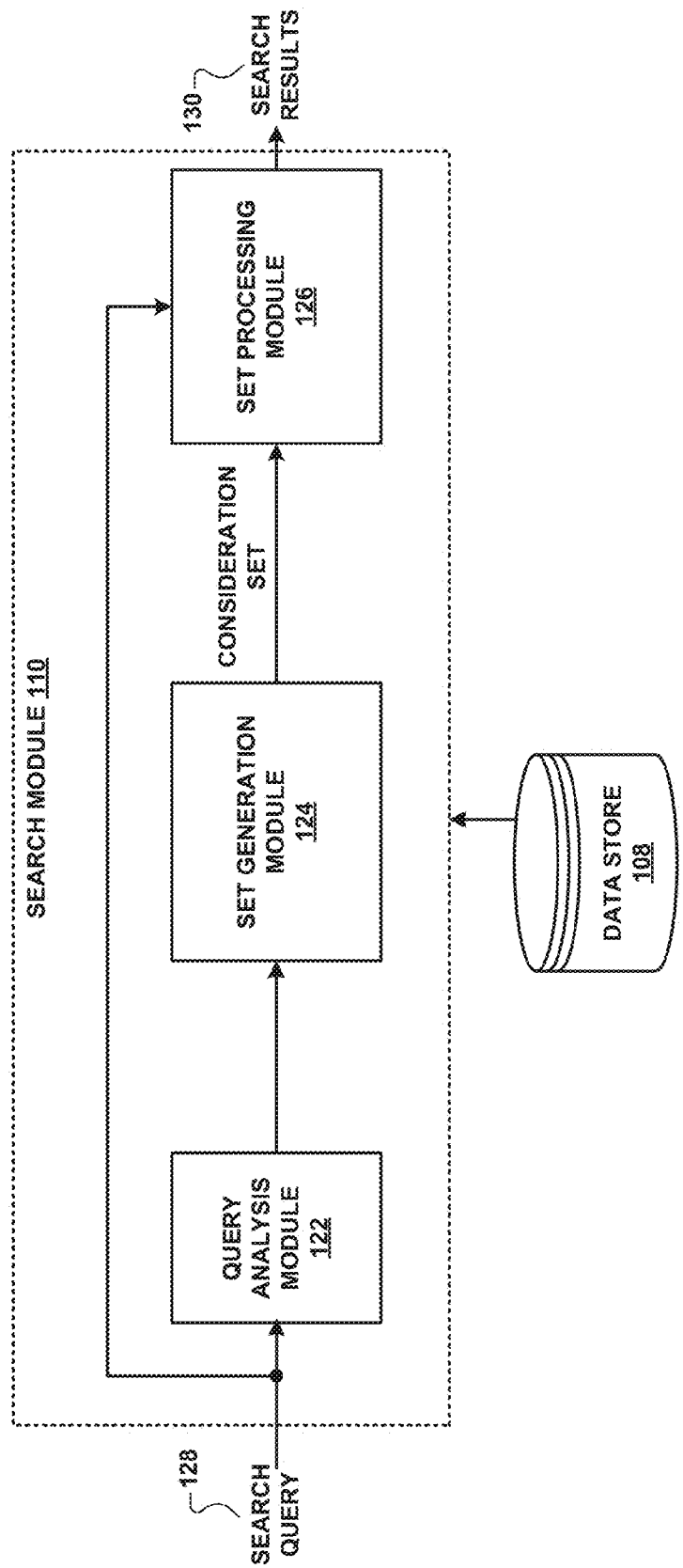
FIG. 3 is a functional block diagram of an example search module.

FIG. 3 shows an example search module 110 which may be included in the search system 100. The search module 110 includes a query analysis module 122, a consideration set generation module 124 (hereinafter, the "set generation module 124"), and a consideration set processing module 126 (hereinafter, the "set processing module 126"). The query analysis module 122 receives a query wrapper including a search query 128. The query analysis module 122 analyzes the received search query 128. The set generation module 124 identifies a set of function records based on the received search query 128. The identified set of function records may be referred to herein as a "consideration set." The set processing module 126 processes (e.g., scores) the consideration set to generate a set of search results 130 that include a list of AAMs selected from the function records of the consideration set.

Figure 4:
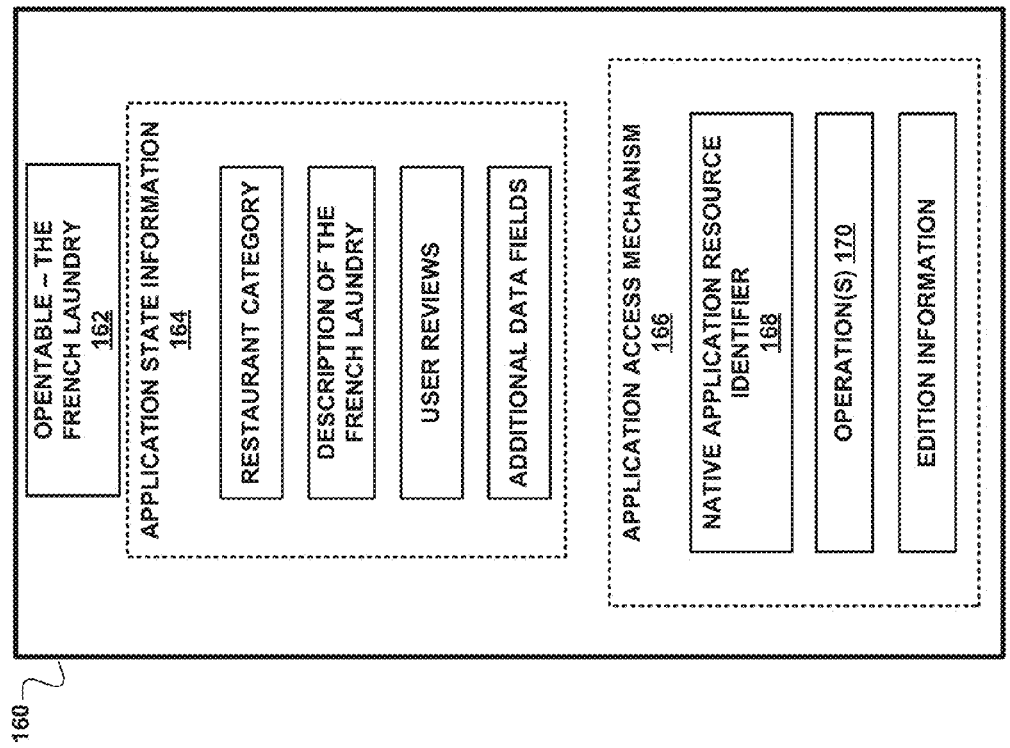
FIGS. 4A and 4B are schematic views of example function records.

Referring now to FIG. 4A, an example function record 150 includes a function ID 152, ASI 154, and a native AAM 156 (hereinafter, the "AAM 156"). The function record 150 may include data related to a function of a native application and/or the state of the native application resulting from performance of the function. The data store 108 may include a plurality of function records each having a similar structure as the function record 150. Put another way, the data store 108 may include a plurality of function records each having a function ID 152, ASI 154, and an AAM 156.

The function ID 152 may be used to identify the function record 150 among the other function records 150 included in the data store 108. The function ID 152 may be a string of alphabetic, numeric, and/or symbolic characters (e.g., punctuation marks) that uniquely identify the function record 150 in which the function ID 152 is included. In some examples, the function ID 152 may describe a function and/or an application state in human readable form. For example, the function ID 152 may include the name of the native application referenced in the AAM 156. Additionally, or alternatively, the function ID 152 may be a human readable string that describes a function performed according to the AAM 156 and/or an application state resulting from performance of the function according to the AAM 156. In some examples, the function ID 152 may include a string in the format of a URL of a WAM for the function record 150, which may uniquely identify the function record, as described with respect to FIG. 9.

In a more specific example, if the function record 150 describes a function of the native application Yelp, the function ID 152 may include the name "Yelp" along with a description of the application state described in the ASI 154. For example, the function ID 152 for a function record that describes the restaurant "The French Laundry®" (hereinafter, "The French Laundry") may be "Yelp—The French Laundry." In an example where the function ID 152 includes a string in the format of a URL, the function ID 152 may include the following string "www.yelp.com/biz/the-french-laundry-yountville-2?ob=1" to uniquely identify the function record 150.

The ASI 154 may include data that describes an application state into which a native application is set according to the AAM 156 included in the function record 150. Additionally, or alternatively, the ASI 154 may include data that describes the function performed according to the AAM 156 included in the function record 150. The ASI 154 may include a variety of different types of data. For example, the ASI 154 may include structured, semi-structured, and/or unstructured data. The ASI 154 may be extracted or inferred from documents retrieved from the data sources 104. In some examples, the ASI 154 may include data that is manually generated. The ASI 154 may be updated so that up-to-date search results can be provided in response to a user search query.

In some examples, the ASI 154 may include data that may be presented to the user when the native application is in the application state defined by the AAM 156. For example, the ASI 154 may include data that describes a state of the native application after the user device 102 has performed the one or more operations indicated in the AAM 156. In one example, if the function record 150 is associated with a shopping application, the ASI 154 may include data that describes products (e.g., names and prices) that are shown when the shopping application is set to the application state defined by the AAM 156 of the function record 150. As another example, if the function record 150 is associated with a music player application, the ASI 154 may include data that describes a song (e.g., name and artist) that is played when the music player application is set to the application state defined by the AAM 156 of the function record 150.

The types of data included in the ASI 154 may depend on the type of information associated with the application state and the functionality defined by the AAM 156. In one example, if the function record 150 is for a native application that provides reviews of restaurants, the ASI 154 may include information (e.g., text and numbers) related to a restaurant, such as a category of the restaurant, reviews of the restaurant, and a menu for the restaurant. In this example, the AAM 156 may cause the native application to launch and retrieve information for the restaurant. As another example, if the function record 150 is for a native application that plays music, the ASI 154 may include information related to a song, such as the name of the song, the artist, lyrics, and listener reviews. In this example, the AAM 156 may cause the native application to launch and play the song described in the ASI 154.

The AAM 156 may include an ARI and/or one or more operations for a user device 102 to perform. For example, an ARI may be a string having an application specific scheme. The ARI may include a reference to a native application and indicate one or more operations for the user device 102 (e.g., the native application) to perform. For example, the ARI may include a reference to a native application, a domain name, and a path to be used by the native application to retrieve and display information to the user.

An example ARI for the native application "OPENTABLE®" by OpenTable, Inc. (hereinafter, "OpenTable") on the ANDROID® OS is "vnd.opentable.deeplink://opentable.comirestaurant/profile?rid=88333&refid=1." A portion of the example ARI references the OpenTable native application. For example, the substring "vnd.opentable.deeplink" of the ARI references the OpenTable native application. The example ARI also indicates one or more operations for the OpenTable native application to perform. For example, the OpenTable native application may retrieve and display the information included in the ARI domain and path defined by the substring "opentable.com/restaurant/profile?rid=88333&refid=1." In response to receiving the ARI, a user device 102 may launch the OpenTable native application and display information retrieved from the location indicated in the ARI. The ARI may be provided by the app developer in some examples.

In some examples, the AAM 156 may include operations for the user device 102 to perform in addition to the operation(s) indicated in the ARI. For example, the search application 116 on the user device 102, the OS 118 of the user device 102, and/or a native application installed on the user device 102 may perform the operations included in the AAM 156 in order to set the native application into an application state specified by the AAM 156. In some examples, the operations may be included in a script. Examples of operations may include, but are not limited to, launching a native application, waiting for the native application to start, creating and sending a search request to a server associated with the native application, setting a current geo-location in a native application, making a restaurant reservation, sending a text message, and adding an appointment to a calendar.

In some examples, the AAM 156 may not include an ARI. Instead, the AAM 156 can include one or more other operations that reference a native application. The operations may be performed by the user device 102. The operations may include instructions for at least one of the search application 116, the OS 118, and a native application on the user device 102. In response to selection of the AAM 156, the user device 102 may perform the operations included in the AAM 156. In some examples, the operations may be included in a script.

The AAM 156 may also include edition information that indicates the native application edition with which the AAM 156 is compatible. For example, the edition information may indicate the OS with which the AAM 156 is compatible. In some examples, the search system 100 can determine whether to transmit the AAM 156 in the search results based on whether the user device 102 (e.g., the OS 118) can handle the AAM 156. As one example, the search system 100 may transmit the edition information for the AAM 156 to the user device 102. In the event the user device 102 does not include the native application edition (e.g., for a particular OS) with which the AAM 156 is compatible, the user device 102 may not display a user selectable link for the AAM 156. In some examples, e.g., in instances where none of the AAM(s) of the function record 150 is compatible with the user device 102 but where the function record 150 also includes a WAM, the user device 102 may instead display a user selectable link for the WAM. In other examples, in cases where the user device 102 does not include the native application edition with which the AAM 156 is compatible, the user device 102 may display a download and install user selectable link for the native application edition to the user. Upon the user selecting the link, the user device 102 may download and install the native application edition, launch the native application edition, and set the native application edition into an application state specified by the AAM 156.

In some examples, an ARI is an application specific resource identifier that is defined by the developer of the application. In this example, the search application 116 receives the ARI and the OS 118 may send the ARI to the native application referenced in the ARI. The native application referenced in the ARI launches and is set into the state specified by the ARI.

In some examples, a native application function may not be accessible using an ARI. For example, a function of the native application may not include a corresponding ARI that the application may use to perform the function. As another example, some native applications may not be configured to receive ARIs. In these examples, an AAM for the native application can include one or more operations that cause the native application to perform the function that may not otherwise be accessible using an ARI. For example, the search application 116 may receive the one or more operations and execute the one or more operations to set the native application into the desired application state. In a specific example, the one or more operations may include launching the native application along with additional operations for the native application to perform. For example, the search application 116 may initially trigger the native application to start the application, and then wait for a period of time for the native application to start. Then the search application 116 may perform additional operations included in the received AAM, such as issuing a search instruction to the native application.

In still other examples, a native application may be configured to directly receive the operations transmitted by the search system 100. In these examples, the native application may be launched according to the AAM and then the launched native application may directly perform the operations received from the search system 100.

A single native application can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different AAMs. For example, with respect to the restaurant reservation application, the data store 108 may include function records having different AAMs for accessing different restaurant reviews and setting up reservations. Similarly, the data store 108 may include function records having different AAMs for booking hotels, booking flights, and accessing reviews for different travel destinations.

The AAMs for a single native application may vary in complexity. In some examples, the AAMs may cause a native application to launch (e.g., the OS 118 may be instructed to launch the application) and then perform additional operations after launching, as described above. In other examples, the AAMs may cause a native application to launch into a default state (e.g., a default homepage) without performing any additional operations. A function record including an AAM that causes a native application to launch into a default state may be thought of as an access mechanism that is related to the native application, but not to any particular state which may be accessed by the application. A function record including such an AAM may include ASI describing the native application, instead of any particular application state. For example, the ASI may include the name of the developer of the application, the publisher of the application, a category (e.g., genre) of the application, a description of the application (e.g., a developer's description), and the price of the application. The ASI may also include security or privacy data about the application, battery usage of the application, and bandwidth usage of the application. The ASI may also include application statistics. Application statistics may refer to numerical data related to a native application. For example, application statistics may include, but are not limited to, a number of downloads, a download rate (e.g., downloads per month), a number of ratings, and a number of reviews.

FIG. 4B shows an example function record 160 associated with the native application OpenTable. OpenTable is a restaurant-reservation application that allows users to search for restaurants and make restaurant reservations. OpenTable provides information about restaurants, including descriptions of restaurants and user reviews of the restaurants. The example function record 160 of FIG. 4B describes an application state of OpenTable in which OpenTable accesses information for the restaurant The French Laundry.

The function record 160 includes the function ID "Opentable—The French Laundry" indicated at 162, which may be used as a unique identifier to identify the function record 160. In other examples, the function ID 162 could include a URL as a unique identifier for the function record 160. For example, the function ID 162 may include the string "http://www.opentable.com/the-french-laundry" as a unique identifier for the function record 160. Such a function ID may be included in a WAM of a function record. In another example, the function ID 162 could be a string of characters, numbers, and/or symbols that are not in human readable form.

The function record 160 includes ASI 164. The ASI 164 includes data fields for restaurant category of the French Laundry, description of the French Laundry, user reviews of the French Laundry, and additional data fields. The restaurant category field may include the text "French cuisine" and "contemporary," for example. The description field for The French Laundry may include text that describes The French Laundry. The user reviews field may include text of user reviews for The French Laundry. The additional data fields may include additional data for The French Laundry that may not specifically fit within the other defined fields, such as a menu for the restaurant, prices, and operating hours for the restaurant.

The function record 160 includes an AAM 166. The AAM 166 may include a reference to the native application OpenTable along with one or more operations to be performed by a user device 102. For example, the AAM 166 may include a native ARI 168 and/or one or more operations 170 that cause the user device 102 to access the entry for The French Laundry in the OpenTable native application. An example ARI 168 may be "vnd.opentable.deeplink://opentable.com/restaurant/profile?rid=1180&refid=1."

Referring back to FIG. 3, the search query 128 received by the search module 110 is used to perform a search of the data store 108. The query analysis module 122 receives the search query 128. The query analysis module 122 may perform various analysis operations on the received search query 128. For example, analysis operations performed by the query analysis module 122 may include, but are not limited to, tokenization of the search query 128, filtering of the search query 128, stemming, synonymization, and stop word removal.

The set generation module 124 identifies a set of function records (i.e., the consideration set) based on the search query 128. In some examples, the set generation module 124 may identify the set of function records based on matches between terms of the search query 128 and terms in the function records. For example, the set generation module 124 may identify a set of function records in the data store 108 based on matches between tokens generated by the query analysis module 122 and words included in the function records, such as words included in the ASI and/or function IDs of the function records.

The set processing module 126 processes the consideration set to generate a set of search results 130 that includes a list of AAMs. In some examples, the set processing module 126 scores the functions records included in the consideration set. The scores associated with the function records may be referred to as "result scores." Accordingly, in some examples, each of the function records in the consideration set may have a corresponding result score. The set processing module 126 may then select function records from the consideration set based on the result scores associated with the function records. For example, the set processing module 126 may select the highest scoring function records of the consideration set.

The set processing module 126 selects AAMs from the selected function records (e.g., the highest scoring function records). The set processing module 126 transmits the selected AAMs to the user device 102 that generated the search query 128. The set processing module 126 may also transmit the result scores associated with the selected AAMs. For example, an AAM may be associated with the result score of the function record from which the AAM was selected.

The information conveyed by the search results 130 may depend on how the result scores are calculated by the set processing module 126. For example, the result scores may indicate the relevance of an application function or application state to the search query 128, the popularity of an application function or state, or other properties of the application function or state, depending on what parameters the set processing module 126 uses to score the function records.

The set processing module 126 may generate result scores for function records in a variety of different ways. In some implementations, the set processing module 126 generates a result score for a function record based on one or more scoring features. The scoring features may be associated with the function record and/or the search query 128. A function record scoring feature (hereinafter, "record scoring feature") may be based on any data associated with a function record. For example, record scoring features may be based on any data included in the ASI of the function record. Example record scoring features may be a quality score, whether the function record includes an AAM that leads to a default state or a deeper native application state, and, for newly generated function records, the number of function records used to generate the newly generated function record, as described hereinafter. A query scoring feature may include any data associated with the search query 128. For example, query scoring features may include, but are not limited to, a number of words in the search query 128, the popularity of the search query 128, and the expected frequency of the words in the search query 128. A record-query scoring feature may include any data which may be generated based on data associated with both the function record and the search query 128 that resulted in identification of the function record by the set generation module 124. For example, record-query scoring features may include, but are not limited to, parameters that indicate how well the terms of the search query 128 match the terms of the ASI of the identified function record. The set processing module 126 may generate a result score for a function record based on at least one of the record scoring features, the query scoring features, and the record-query scoring features.

The set processing module 126 may determine a result score based on one or more of the scoring features listed herein and/or additional scoring features not explicitly listed. In some examples, the set processing module 126 may include one or more machine-learned models (e.g., a supervised learning model) configured to receive one or more scoring features. The one or more machine-learned models may generate result scores based on at least one of the record scoring features, the query scoring features, and the record-query scoring features. For example, the set processing module 126 may pair the search query 128 with each function record and calculate a vector of features for each (query, record) pair. The vector of features may include one or more record scoring features, one or more query scoring features, and one or more record-query scoring features. The set processing module 126 may then input the vector of features into a machine-learned regression model to calculate a result score for the function record. In some examples, the machine-learned regression model may include a set of decision trees (e.g., gradient boosted decision trees). In another example, the machine-learned regression model may include a logistic probability formula. In some examples, the machine-learned task described above can be framed as a semi-supervised learning task, where a minority of the training data is labeled with human curated scores and the rest of the data is used without human labels.

The result scores associated with the AAMs may be used in a variety of different ways. In some examples, the result scores associates with AAMs may be used to rank the list of AAMs. In these examples, a higher result score may indicate that the AAM (e.g., the function or application state) is more relevant to a user than an AAM having a smaller result score. In examples where the search results 130 are displayed as a list on a user device 102, the links for AAMs associated with larger result scores may be listed closer to the top of the results list (e.g., near to the top of the screen). In these examples, links for AAMs having lower result scores may be located farther down the list (e.g., off screen) and may be accessed by scrolling down the screen of the user device 102. In some examples, as illustrated in FIG. 2, the user device 102 may group together the links associated with the same native application.

Figure 5:
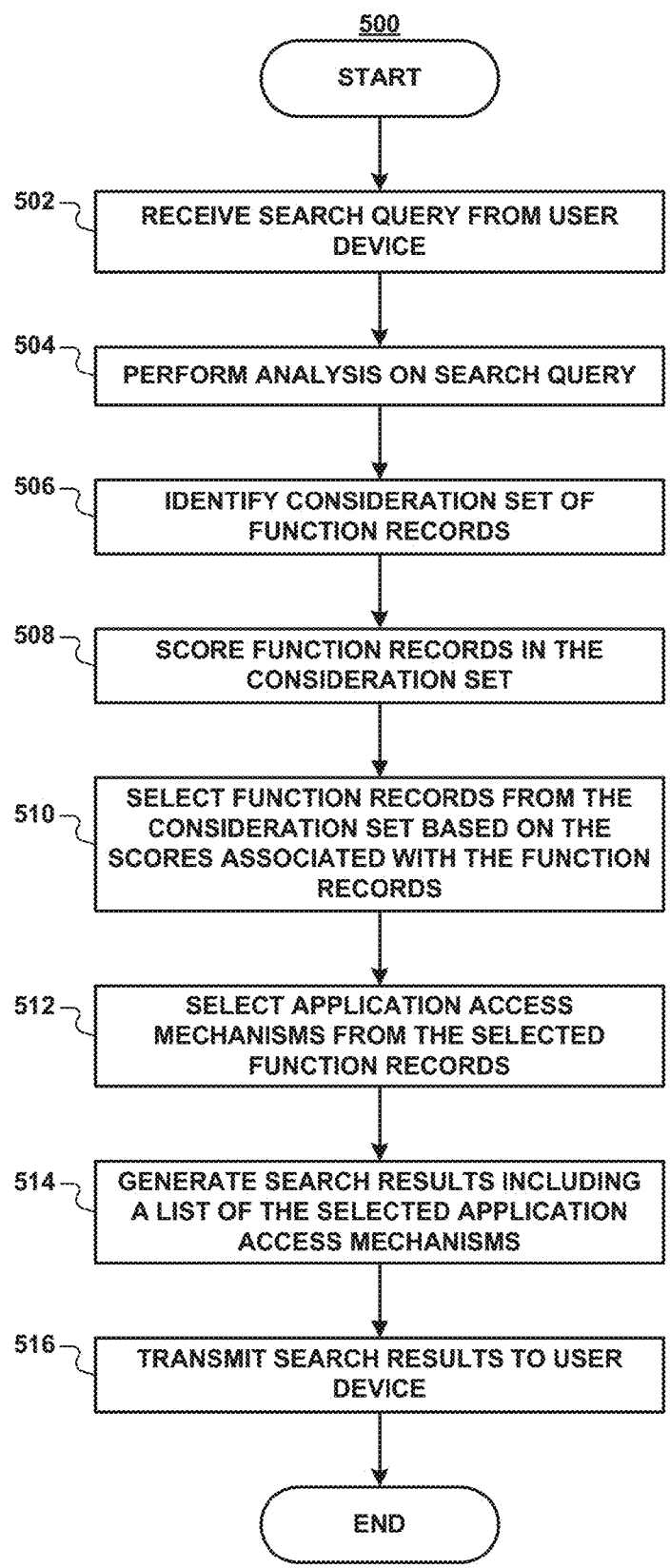
FIG. 5 is a flow diagram of an example method for performing a search for function records based on a received search query.

FIG. 5 shows an example method 500 for performing a search based on a received search query. The method 500 is described with reference to the search module 110 of FIG. 3. In block 502, the query analysis module 122 receives a search query 128 generated by a user device 102. In block 504, the query analysis module 122 analyzes the search query 128.

In block 506, the set generation module 124 identifies a consideration set of function records based on the search query 128 (e.g., based on output from the query analysis module 122). In blocks 508-510, the set processing module 126 processes the consideration set of function records. In block 508, the set processing module 126 generates result scores for the function records included in the consideration set. In block 510, the set processing module 126 selects function records from the consideration set based on the result scores associated with the function records. For example, the set processing module 126 may select function records having the highest result scores.

In block 512, the set processing module 126 selects AAMs from the selected function records. In block 514, the set processing module 126 generates search results including a list of the selected AAMs. In block 516, the set processing module 126 transmits the search results to the user device 102 that generated the search query 128.

Figure 6:
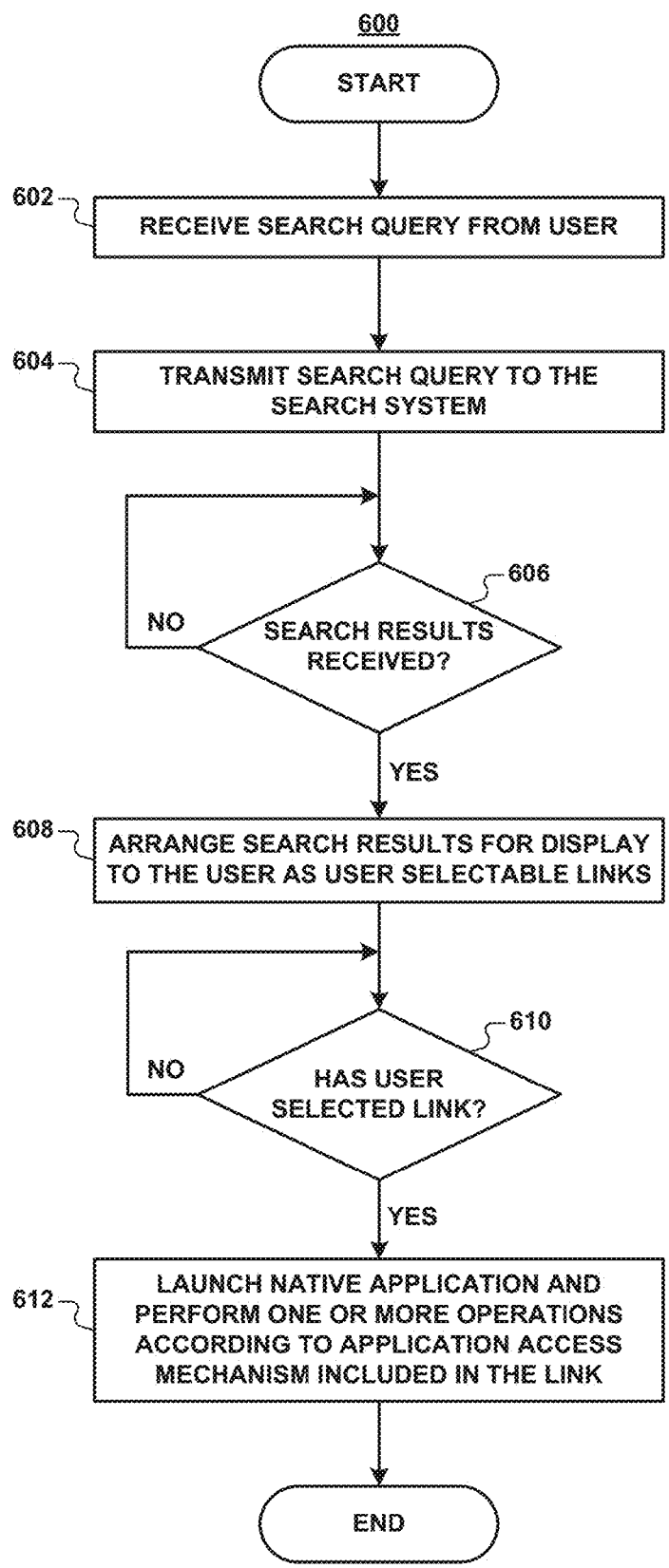
FIG. 6 is a flow diagram of an example method describing operation of a user device.

FIG. 6 shows an example method 600 describing operation of an example user device 102. It may be assumed that the user device 102 described according to the method 600 includes a search application 116 (e.g., a native application or web browser implementation) that is configured to communicate with the search system 100. It may also be assumed that the search application 116 running on the user device 102 generates a GUI that receives search queries and displays search results. The method 600 is described with reference to the search system 100 and user device 102 of FIGS. 1-2.

In block 602, the search application 116 receives a search query 128 from the user. For example, the search query 128 may have been entered into the GUI of the search application 116. In block 604, the user device 102 transmits the search query 128 to the search system 100. In block 606, the user device 102 waits for the search results to be received. The method 600 continues in block 608 when the search results are received from the search system 100. The search results may include a list of AAMs. The search results may also include result scores associated with the AAMs. Additionally, the search results may include link data (e.g., text and/or images) for each of the AAMs. The search application 116 may generate user selectable links in the GUI based on the received link data.

In block 608, the search application 116 arranges the search results for display to the user. The search results may include links for each of the AAMs included in the search results. In block 610, the search application 116 waits for the user to select one of the user selectable links. The method 600 continues in block 612 when the user selects (e.g., touches) one of the links in the search results. In response to selection of a link for an AAM, the user device 102 launches the native application referenced in the AAM and performs one or more operations indicated in the AAM in block 612.

FIGS. 7A-7B illustrate an example of a search application on a user device 200. In FIG. 7A, a user has entered a search query 202 into a GUI of the search application. Specifically, the user has entered the search query "Late night diners" into a search field (e.g., a search bar) 210 of the GUI. The user can select (e.g., touch or click) a search button 204 of the GUI in order to transmit a query wrapper including the search query 202 to the search system 100.

The search system 100 receives the query wrapper and identifies one or more function records based on the search query 202 included in the query wrapper. The search system 100 processes the identified function records and selects AAMs from the identified function records. In the example of FIG. 7A, the search system 100 identified function records that represent application states in the native application Yelp and the native application "TRIPADVISOR®" by TripAdvisor, LLC (hereinafter, "TripAdvisor"). For example, the search system 100 identified function records that correspond to the entries in Yelp for "IHOP," "Denny's," and "Taco Bell." The search system 100 also identified function records that correspond to the entries in TripAdvisor for "McDonald's," "Perkins," and "In-N-Out." Although only links for Yelp and TripAdvisor are visible in the GUI in FIG. 7A, the search system 100 may have identified additional function records for Yelp, TripAdvisor, and additional native applications that are not illustrated in FIG. 7A. Furthermore, the search system 100 may have transmitted additional AAMs to the user device 200 that are not shown in the GUI of FIG. 7A.

The search results transmitted to the user device 200 include AAMs for the application functions/states indicated in the links 206a, 206b, . . . , 206f (collectively, the "links 206"). The search results also include link data (e.g., text and images) associated with each of the AAMs. For example, the "IHOP" link 206a includes the text "IHOP" and an image of pancakes. A user may select (e.g., touch or click) the links 206 to access the application function/state indicated in the links 206. For example, a user may select the area of the GUI including the "IHOP" link 206a in order to access the entry in the Yelp native application for "IHOP." In FIG. 7A, the links 206 are grouped together according to the native applications associated with the links 206. For example, the Yelp links 206a, 206b, and 206c and the TripAdvisor links 206d, 206e, and 206f are grouped together under Yelp and TripAdvisor headers 208a, 208b, respectively. In other examples, links for different native applications may be mixed instead of grouped.

In the example of FIG. 7A, the user selects the "Denny's" link 206b. In response to selection of the "Denny's" link 206b, the user device 200 launches the Yelp native application and performs one or more operations according to the AAM associated with the "Denny's" link 206b. In the example of FIG. 7A, the AAM associated with the "Denny's" link 206b may reference the Yelp native application and indicate a path for the Yelp native application to find information for the "DENNY'S®" restaurant listed in the link. For example, an ARI may reference the Yelp native application and indicate one or more operations for the Yelp native application to perform, such as retrieving data from the path included in the ARI. Accordingly, the ARI of the AAM may cause the Yelp native application to perform the function of retrieving and displaying information for the "DENNY'S®" restaurant. An example ARI for the Yelp native application may include the string "yelp:///biz/dennys-sunnyvale." FIG. 7B shows an example GUI 212 of the Yelp native application after the user has selected the "Denny's" link 206b. In FIG. 7B, the Yelp native application is set into a state in which the Yelp native application is displaying retrieved information about the "DENNY'S®" restaurant.

FIG. 8A shows an example function record 220 including multiple different AAMs. The function record 220 includes a function ID 222 and ASI 224, as described above. The function record 220 includes a first AAM 226a, a second AAM 226b, and a third AAM 226c (collectively, the "AAMs 226").

The different AAMs 226 included in the function record 220 may be associated with different editions of a native application. For example, the first, second, and third AAMs 226 may be associated with first, second, and third editions of a native application, respectively. The different AAMs 226 in the function record 220 may be associated with different operating systems and/or different versions of a native application. In a specific example, the AAMs 226 may be associated with different operating systems. For example, the AAMs 226 may each include an ARI that is specific to a different OS, such as ANDROID®, IOS®, or WINDOWS PHONE®. More specifically, an ARI for a first edition of a native application that runs on a first OS may be different than an ARI for a second edition of the native application that runs on a second OS. As another example, the ARIs of the AAMs 226 may be different for native application editions that are different versions, but run on the same OS. The operations included in the AAMs 226 may also be specific to different operating systems and/or versions.

In some examples, the different AAMs 226 in the function record 220 may be associated with different versions of a native application for the same OS. For example, the AAMs 226 may each be associated with a different version of a native application for the ANDROID® OS. Different versions may include a version 1.0 of a native application and a later released version 2.0 of the native application. In another example, different versions of a native application may be versions of the native application designed for different devices. For example, a first version of a native application may be designed for a smart phone. A second version of the native application may be designed for a tablet computing device having a different set of specifications (e.g., screen size and resolution) than the smart phone for which the first version of the native application was designed.

As described with respect to FIG. 4A, an AAM may include edition information that indicates the native application edition with which the AAM is associated. In this context, the first AAM 226a may include an ARI and/or one or more operations that are compatible with a specific native application edition. The first AAM 226a may also include edition information that indicates the specific native application edition with which the ARI and/or the operations are compatible. The second and third AAMs 226b, 226c may also include edition information that indicates the specific native application editions with which the second and third AAMs 226b, 226c are associated.

The different AAMs 226 included in the function record 220 may cause the corresponding native application editions to launch and perform similar functions so that the application editions are set into similar application states. For example, the different AAMs 226 included in the function record 220 may cause the corresponding native application editions to be set into the application state described by the function record 220 (e.g., the ASI 224). Accordingly, although the ARIs and/or the operations included in the AAMs 226 may be different, the different AAMs 226 may cause the different native application editions to be set into similar application states. In one example, if the different AAMs 226 reference different editions of an internet music player application, the different AAMs 226 may cause the different application editions to play the same song. In another example, if the different AAMs 226 reference different editions of a restaurant reservation application, the different AAMs 226 may cause the different application editions to retrieve reservation information for the same restaurant.

FIG. 8B shows a specific example of a function record 240 for an entry for The French Laundry in the OpenTable native application. The function record 240 includes a function ID 242 "Opentable—The French Laundry." The function record 240 also includes ASI 244 that may include information that is similar to that described above with respect to FIG. 4B.

The function record 240 includes two AAMs 246a, 246b. The first AAM 246a is associated with an edition of OpenTable that runs on the ANDROID® OS. Accordingly, edition (i.e., ANDROID®) information 248a included in the function record 240 may indicate that ANDROID® operations 250a and ANDROID® native ARI 252a also included in the function record 240 are compatible with the ANDROID® OS. Furthermore, the edition information 248a may specify one or more specific versions of the ANDROID® OS and one or more versions of the OpenTable application with which the ARI 252a and the operations 250a are compatible. The second AAM 246b is associated with an edition of OpenTable that runs on the IOS® OS. Accordingly, edition (i.e., IOS) information 248b included in the function record 240 may indicate that IOS® operations 250b and IOS® native ARI 252b also included in the function record 240 are compatible with the IOS® OS. Furthermore, the edition information 248b may specify one or more specific versions of the IOS® OS and one or more versions of the OpenTable application with which the ARI 252b and the operations 250b are compatible.

During a search for function records, the search system 100 (e.g., the set generation module 124) may identify one or more function records that include multiple AAMs, as described above. In these scenarios, the set processing module 126 may process (e.g., score) the identified set of function records in the manner described above. For example, the set processing module 126 may select function records from the consideration set based on the result scores associated with function records.

As described above, the set processing module 126 selects AAMs from the selected function records (e.g., the highest scoring function records) and transmits the selected AAMs to the user device 102 that generated the search query 128. In some implementations of the search system 100, the set processing module 126 may transmit each of the multiple AAMs of a function record to the user device 102 so that the user device 102 can determine which AAM to use. For example, assuming the function record 240 of FIG. 8B was selected by the set processing module 126, the set processing module 126 may transmit both the first and second AAMs 246a, 246b to the user device 102. In this example, the user device 102 may determine which of the AAMs 246a, 246b to use. If the user device 102 is running an ANDROID® OS, the user device 102 could select the first AAM 246a. Alternatively, if the user device 102 is running an IOS® OS, the user device 102 could select the second AAM 246b.

In some implementations of the search system 100, the set processing module 126 determines which of the multiple AAMs in a function record to transmit to the user device 102. The set processing module 126 may determine which of the multiple AAMs to transmit based on information included in the query wrapper received from the user device 102. For example, the set processing module 126 may select and transmit one or more of the AAMs that are likely to be compatible with the user device 102. In a scenario where the function record 240 of FIG. 8B is selected by the set processing module 126 and the set processing module 126 determines that the user device 102 is running an ANDROID® OS, the set processing module 126 may select the first AAM 246a to transmit to the user device 102. In this scenario, the set processing module 126 may refrain from transmitting the second AAM 246b associated with the IOS® OS to the user device 102.

Figure 9:
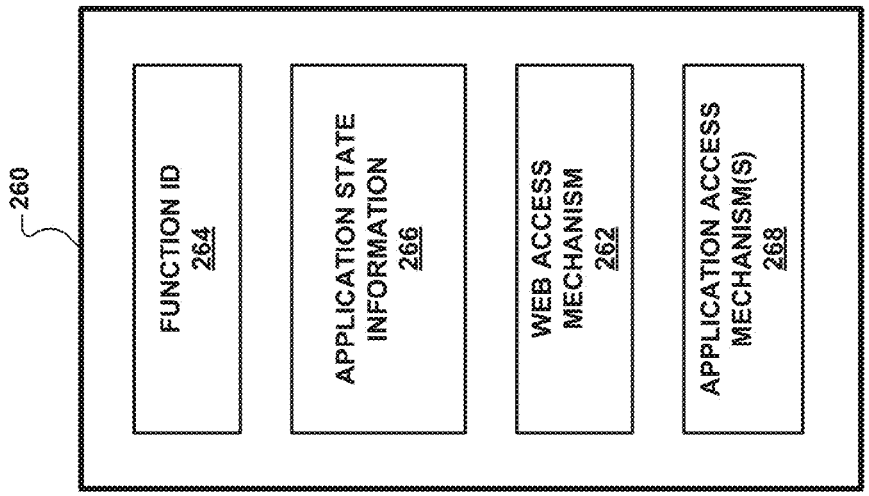
FIG. 9 is a schematic view of an example function record that includes a web access mechanism.

FIG. 9 shows an example function record 260 that includes a WAM 262. The function record 260 also includes a function ID 264, ASI 266, and one or more AAMs 268, as described above. The WAM 262 may be used by a wide variety of user devices 102 running different operating systems. In some examples, the WAM 262 includes a web resource identifier, such as a URL (i.e., a web address) used with HTTP.

The WAM 262 (e.g., a URL) included in the function record 260 may be used by a web browser application to access a web resource that includes similar information and/or performs similar functions as would be performed by a native application that receives the AAM(s) 268 of the function record 260. In one example, the WAM 262 may direct a web browser to a web version of the native application referenced in the AAM(s) 268. If the function record 260 is for a specific Mexican restaurant in Yelp, the AAM(s) 268 may include a reference to the Yelp native application and one or more operations that access an entry for the specific Mexican restaurant in the Yelp native application. In this example, the WAM 262 may include a web address that a web browser may use to access the entry for the specific Mexican restaurant on a Yelp web page.

During a search for function records, the search system 100 (e.g., the set generation module 124) may identify one or more function records that each include a WAM. In these scenarios, the set processing module 126 may process (e.g., score) the identified set of function records in the manner described above. For example, the set processing module 126 may select function records from the consideration set based on the result scores associated with the identified function records.

In some implementations of the search system 100, the set processing module 126 determines which of the multiple AAM(s) 268 and the WAM 262 should be transmitted to the user device 102. The set processing module 126 may determine whether to transmit the WAM 262 and/or the AAM(s) 268 of the function record 260 based on information included in the query wrapper received from the user device 102. For example, the set processing module 126 may select and transmit the WAM 262 and/or the AAM(s) 268 based on which of the WAM 262 and/or the AAM(s) 268 are likely to be compatible with the user device 102.

In scenarios where the set processing module 126 determines that one or more of the AAM(s) 268 is compatible with the user device 102, the set processing module 126 may transmit the one or more compatible AAMs. In these scenarios, the set processing module 126 may refrain from transmitting the WAM 262 and those AAMs that are determined to be incompatible with the user device 102. In other scenarios, if the set processing module 126 determines that none of the AAM(s) 268 is compatible with the user device 102, the set processing module 126 may transmit the WAM 262 and refrain from transmitting the AAM(s) 268.

Figure 10:
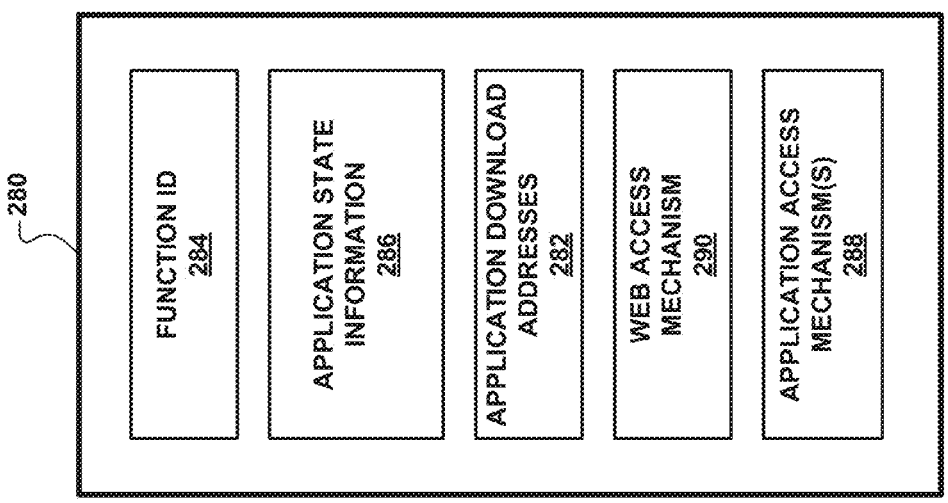
FIG. 10 is a schematic view of an example function record that includes application download addresses.

FIG. 10 shows an example function record 280 that includes one or more application download addresses 282. The function record 280 also includes a function ID 284, ASI 286, one or more AAMs 288, and a WAM 290, as described above. An application download address 282 can be used by a user device 102 to download the native application referenced in the AAM(s) 288 in the event that the native application is not installed on the user device 102. In some examples, the application download address 282 may include a web address (e.g., a URL) at which the native application can be previewed and downloaded. For example, the application download address 282 may direct a web browser of a user device 102 to a digital distribution platform that is configured to distribute native applications. Example digital distribution platforms include, but are not limited to, GOOGLE PLAY® developed by Google Inc., the APP STORE® developed by Apple Inc., and WINDOWS PHONE STORE developed by Microsoft Corporation. If a user device 102 includes a native download application for accessing a digital distribution platform, the application download address 282 may direct the installed native download application to a site where the native application referenced in the AAM(s) 288 can be downloaded.

During a search, the search system 100 (e.g., the set generation module 124) may identify one or more function records that each include an application download address 282. In these scenarios, the set processing module 126 may process (e.g., score) the identified set of function records in the manner described above. The set processing module 126 may also select function records from the consideration set and select which AAMs of the selected function records to transmit to the user device 102, as described above. The set processing module 126 may transmit the selected AAMs and the one or more application download addresses 282 to the user device 102.

As described above, different AAMs in a function record may be associated with different operating systems. A first AAM may be for a native application running on the ANDROID® OS. A second AAM may be for the native application running on the IOS® OS. In this example, the first AAM can be associated with a first application download address for downloading the ANDROID® edition of the native application. The second AAM can be associated with a second application download address for downloading the IOS® edition of the native application.

As described above, the search system 100 may transmit an AAM 288 and an application download address 282 for downloading the native application referenced in the AAM 288. If the user device 102 has the native application that is referenced in the AAM 288 installed, then the user device 102 (e.g., the search application 116) can generate a user selectable link that uses the AAM 288. For example, in response to selection of the user selectable link using the AAM 288, the user device 102 launches the native application referenced in the AAM 288 and performs one or more operations included in the AAM 288. If the user device 102 does not have the native application installed, the user device 102 can determine that the native application is not installed and then generate a user selectable link that uses the application download address 282. In response to selection of the user selectable link using the application download address 282, the user device 102 can launch the web browser or a native application and direct the user to a site (e.g., a digital distribution platform) where the native application can be downloaded. A user selectable link including the application download address 282 may include link data (e.g., text and/or images) indicating that the user can download the native application by selecting (e.g., touching) the user selectable link. An example user selectable link 324e including an application download address is illustrated in FIG. 12.

As described above, the data store 108 may include one or more databases, indices (e.g., inverted indices), tables, files, or other data structures which may be used to implement the techniques of the present disclosure. In some examples, the data store 108 may include access tables that include different access mechanisms. With respect to FIG. 10, an access table for the function record 280 may include the application download addresses 282, the WAM 290, and the AAM(s) 288. The access table may also include the function ID 284, which serves as a unique identifier for the access table. In examples where the data store 108 includes access tables for function records, the search system 100 may identify function records and score the function records as described above. The search system 100 may then select the access mechanisms from the access tables identified by the function IDs of the function records and transmit the access mechanisms in the access tables to the user device 102. For example, with respect to the function record 280 of FIG. 10, the search system 100 may identify and score the function record 280 as described above. The search system 100 (e.g., the set processing module 126) may then use the function ID 284 to identify an access table that includes the application download addresses 282, the WAM 290, and the AAM(s) 288. The search system 100 can then select and transmit the application download addresses 282, the WAM 290, and the AAM(s) 288 to the user device 102.

Multiple different ways for accessing native application functionality and/or web application functionality are described above. For example, a user device 102 may access functionality of a native application using an AAM. In the case where the user device 102 does not have a native application installed, the user device 102 may download the native application by following the application download address, thereby allowing the user device 102 to use the AAM in the search results. Additionally, or alternatively, the user device 102 may also access functionality of a web application using a WAM. For example, if the user device 102 does not have a native application installed, the user device 102 may instead generate a user selectable link including a WAM to access similar functionality. Providing these different mechanisms for accessing functionality may help ensure that a user device 102 has the ability to access the desired functionality present in the search results.

In some examples, the search application 116 may be configured to generate user selectable links according to a hierarchy. For example, the search application 116 may be configured to generate a link including an AAM if a compatible AAM is received and the native application is currently installed. If the native application is not installed, then the search application 116 may generate a link including the WAM or including the application download address. In some examples, instructions to the search application 116 for which mechanism to use may be included along with the search results.

Figure 11:
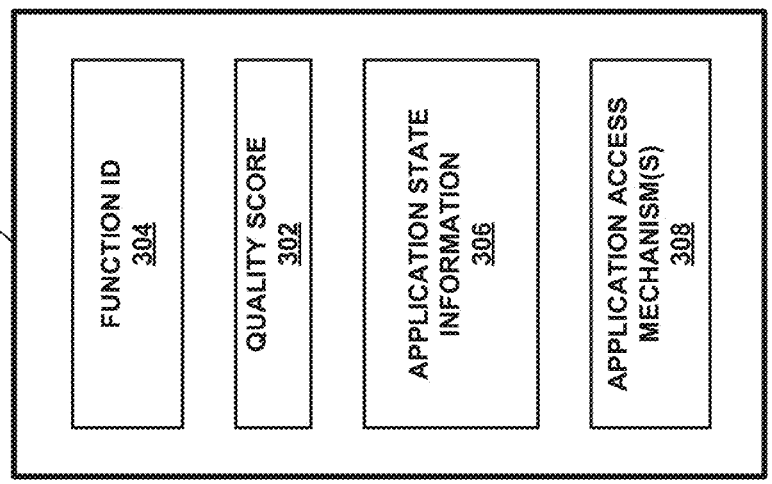
FIG. 11 is a schematic view of an example function record that includes a quality score.

Referring now to FIG. 11, the function record 300 includes a quality score 302. The function record 300 also includes a function ID 304, ASI 306, and one or more AAMs 308, as described above. The quality score 302 may be included in any of the function records described herein.

The quality score 302 may be a number used by the search system 100 to generate a result score for the function record 300. For example, the set processing module 126 may generate the result score for the function record 300 based on the quality score 302 included in the function record 300. As described above, in some implementations, the set processing module 126 generates a result score for a function record based on one or more scoring features, including record scoring features that may be based on data associated with a function record. For those function records that include quality scores, the set processing module 126 may use the quality score as a record scoring feature. In these examples, the set processing module 126 may generate a result score based on the quality score 302. For example, one or more machine-learned models may generate result scores using the quality score 302 as a record scoring feature.

The quality score 302 may be determined based on metrics associated with the person, place, or thing described in the function record 300 (e.g., in the ASI 306). For example, the quality score 302 may be based on the popularity of a place described in the function record 300 and/or ratings (e.g., user ratings) of the place described in the function record 300. In another example, the quality score 302 may be based on the popularity of a song described in the function record 300 and/or ratings (e.g., user ratings) of the song described in the function record 300. The quality score 302 may also be determined based on measurements associated with the function record 300. For example, the quality score 302 may be determined based on data indicating how often the function record 300 is retrieved during a search and how often the AAM(s) 308 of the function record 300 are selected by a user.

FIG. 12 illustrates an example GUI of a search application running on a user device 320. In FIG. 12, a user has entered a search query 322 ("Late night diners by me") into the GUI of the search application (e.g., into a search field 326 of the GUI). The user has interacted with the GUI in order to transmit a query wrapper including the search query 322 to the search system 100 (e.g., by selecting a search button 328 of the GUI). The search system 100 has identified function records and selected AAMs, WAMs, and application download addresses from the identified function records, as described above. In the example of FIG. 12, the search system 100 has identified function records including references to the native applications Yelp, TripAdvisor, OpenTable, and "URBANSPOON®" by Wanderspot LLC (hereinafter, "Urbanspoon"). It may be assumed that the user device 320 of FIG. 12 has the Yelp and TripAdvisor native applications installed. It may also be assumed that the OpenTable and Urbanspoon native applications are not installed on the user device 320.

The GUI of FIG. 12 illustrates different types of links 324a, 324b . . . , 324e for the function records identified for Yelp, TripAdvisor, OpenTable, and Urbanspoon. As described above, the search system 100 has identified function records that correspond to the entries in Yelp for "IHOP" and "Denny's," which are included in the GUI. The links 324a, 324b include AAMs that launch the Yelp native application and retrieve the entries in Yelp for "IHOP" and "Denny's." If the Yelp native application was not installed on the user device 320, the GUI may still display the entries in Yelp for "IHOP" and "Denny's," but the user device 320 may include an application download address in the links 324a, 324b so that, upon a user selecting one or both of the links 324a, 324b, the user device 320 would be directed to download the Yelp native application. In an example where the links 324a, 324b include an application download address, the links 324a, 324b may also include data (e.g., text and/or images) that indicate to a user that selection of the links 324a, 324b will direct the user to a site for downloading the Yelp native application. For example, the links 324a, 324b may include text and/or an image that says "Download." The GUI of FIG. 12 also includes a link 324g that represents a Yelp header for the links 324a, 324b, as described herein.

The link 324c may be associated with an AAM for the TripAdvisor native application. For example, the AAM included in the link 324c may cause the user device 320 to launch the TripAdvisor native application to a default state, as described above. In other examples, the AAM included in the link 324c may cause the user device 320 to launch TripAdvisor and cause TripAdvisor to perform a search within TripAdvisor using the search query 322 (i.e., cause TripAdvisor to search for "Late night diners by me"). In other words, in some examples, a user device 102 may receive an AAM along with search results 130 received in response to transmitting a search query 128 to the search system 100. The user device 102 may include the AAM in a user selectable link as part of displaying the search results 130 to a user. Upon the user selecting the user selectable link, the AAM may cause the user device to perform a search within a native application included on the user device using the search query. In some examples, the AAM may reference the native application. In this manner, the AAM may be used as part of so-called "search forwarding." In search forwarding, a search result 130 received by a user device 102 from the search system 100 in response to a search query 128 causes a native application included on the user device 102 to perform a search using the same search query 128

The link 324d may be include a WAM for the OpenTable web-based application. For example, the WAM may direct a web browser of the user device 320 to entries for one or more late night diners in the OpenTable web-based application. In some examples, the WAM included in the link 324d may cause the user device 320 to launch the OpenTable web-based application and cause it to perform a search using the search query 322 in a similar manner as described above with respect to search forwarding. Accordingly, in response to selection of the link 324d, the user device 320 may launch a web browser and retrieve information at the web address included in the WAM. As described above, since the OpenTable native application is not installed on the user device 320, the search application may have presented the link 324d to the user so that the user could access the desired functionality via a WAM.

The link 324e may include an application download address for the Urbanspoon native application. Since the user device 320 does not have the Urbanspoon native application installed, the user device 320 displays the link 324e that includes an application download address for the Urbanspoon native application. The user device 320 also displays the link 324e such that it includes a GUI element 330 with a string "Download," which prompts the user to select the link 324e to download and install Urbanspoon. In response to selection of the link 324e, the user device 320 may access a site (e.g., a digital distribution platform) for downloading the Urbanspoon native application.

In some implementations, a function record may include location data. The search system 100 may use location data in function records to filter out function records that may not be relevant to a user because of the location of the user relative to the places described in the function records. For example, the search system 100 may filter out function records in which the user is located too far from the place(s) described in the function records for the place(s) to be relevant to the user.

FIGS. 13A-16 describe how the search system 100 may generate new function records based on concepts included in already existing function records. FIGS. 13A-13B show example function records 400, 402 that include concept fields 404, 406. FIGS. 14A-14C show example function records 420, 422, 424 that were generated for individual concepts included in concept fields of already existing function records.

Referring now to FIG. 13A, the function record 400 includes the concept field 404 (i.e., the concept(s) 404). The function record 400 also includes a function ID 408, ASI 410, and one or more AAMs 412, as described above. The concept field 404 may be included in any of the function records described herein. The concept field 404 may include one or more concept names that each describe a concept related to, or associated with, information (e.g., ASI 410) included in the function record 400 and/or functionality provided by the function record 400. In this disclosure, a concept field of a function record including a concept name that describes a concept related to the function record may be referred to as the function record including the concept, or the concept field including the concept.

A concept name included in the concept field 404 may include one or more words that describe a concept associated with the function record 400. The one or more concept names included in the concept field 404 may describe the one or more concepts associated with the function record 400, such as categories or classifications of information (e.g., ASI 410) included in the function record 400. For example, if the AAM(s) 412 provide access to a movie database application (e.g., "IMDB®" by IMDb.com Inc.), the concepts included in the concept field 404 may include, but are not limited to, a movie genre, a movie rating, and/or a movie director. In a more specific example, if the AAM(s) 412 retrieve information from a movie database for the film "The Godfather," and the ASI 410 describes the movie "The Godfather," then the concept field 404 may include concepts such as "Crime movie," "Drama movie," "1970s movie," "Director—Francis Ford Coppola," "Actor—Marion Brando," and "R-rated movie." In another example, if the function record 400 describes a restaurant, the concept field 404 may include different categories that are associated with the restaurant described in the function record 400. In a more specific example, if the function record 400 describes an Italian-American restaurant, the concept field 404 may include the concepts "Italian cuisine" and "American cuisine."

FIG. 13B shows an example function record 402 for an entry in the Yelp native application for a fictional "Starbucks®" store by the Starbucks Coffee Company (hereinafter, "Starbucks"). The function ID 414 of the function record 402 is "Yelp—Starbucks #5." The number "5" of the function ID 414 is a store number used to differentiate the Starbucks store of the function record 402 from other Starbucks stores. The function record 402 also includes ASI 416 and one or more AAMs 418, as described above. The AAM(s) 418 may cause a user device 102 to launch the Yelp native application and retrieve the entry for the Starbucks #5 store in the Yelp database.

The concept field 406 includes two concepts: "Yelp—Coffee" and "Yelp—Breakfast." The concept "Yelp—Coffee" applies to the function record 402 because the function record 402 includes the AAM(s) 418 for the Yelp native application that access an entry within Yelp for a Starbucks store that serves coffee. The concept "Yelp—Breakfast" also applies to the function record 402 because the function record 402 includes the AAM(s) 418 for the Yelp native application that access an entry within Yelp for a Starbucks store that serves breakfast sandwiches and drinks. In some examples, the ASI 416 may include information related to the coffee served at the Starbucks store and the items that are available for breakfast at the store.

In some examples, the search system 100 may automatically generate one or more concepts included in a concept field of a function record. For example, if ASI of a function record describes a restaurant that serves Italian cuisine, the search system 100 can assign a concept "Italian cuisine" to the function record. Similarly, if ASI of a function record describes an R-rated action movie, the search system 100 can assign the concepts "R-rated movie" and "action movie" to the function record. In other examples, one or more concepts included in a concept field of a function record may be populated by a human operator.

The search system 100 may generate new function records using the concepts included in already existing function records. For example, the search system 100 can generate a new function record for each concept included in the concept fields of already existing function records. For example, with respect to FIGS. 13B, 14B, and 14C, the search system 100 can generate the function record 422 of FIG. 14B for the concept "Yelp—Coffee" and another function record, namely the function record 424 of FIG. 14C, for the concept "Yelp—Breakfast." As explained above, both of the concepts "Yelp—Coffee" and "Yelp—Breakfast" are included in the concept field 406 of the function record 402 of FIG. 13B.

Figure 14C:
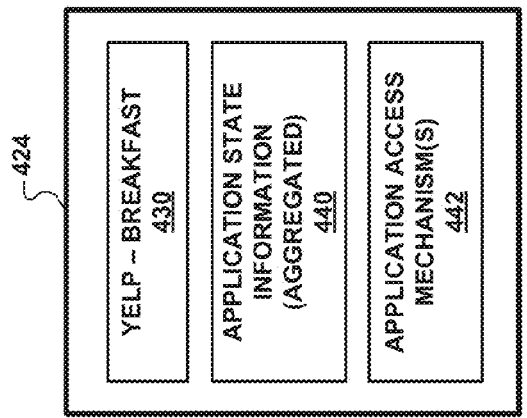
FIGS. 14A-14C are schematic views of example function records that were generated from previously existing function records based on concepts included in the previously existing function records.
Figure 14B:
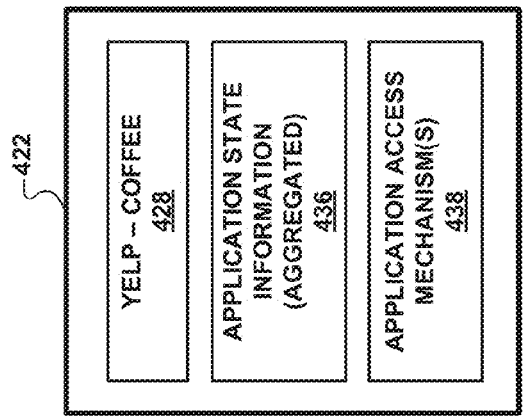
Figure 14A:
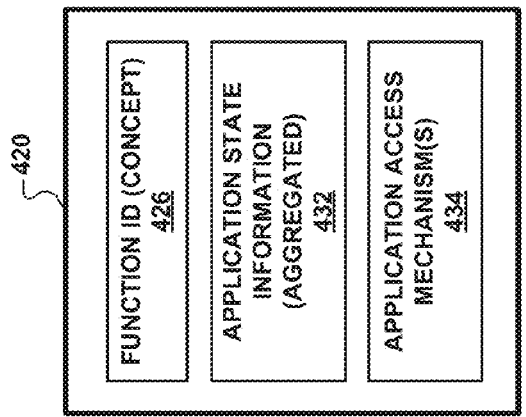

FIG. 14A shows an example function record 420 that was generated based on a single concept that was included in concept fields of a plurality of different function records. The function ID 426 of the function record 420 may include the concept name associated with the function record 420. For example, with respect to FIG. 14B, the function ID 428 of the function record 422 is "Yelp—Coffee," which is a concept included in the function record 402 of FIG. 13B. As another example, with respect to FIG. 14C, the function ID 430 of the function record 424 is "Yelp—Breakfast," which is a concept included in the function record 402 of FIG. 13B.

The function record 420 includes ASI 432, which is aggregated from multiple different function records. For example, the ASI 432 may include the ASI from multiple different function records having the same concept. In a more specific example, the ASI 432 may include the ASI from multiple different function records each having the concept named in the function ID 426. For example, if the function record 420 has a function ID "action movie," the ASI 432 may include the ASI from multiple different function records each having the concept "action movie." Accordingly, the ASI 432 generated based on a plurality of different function records may include an aggregation of the ASI of the plurality of different function records. In some examples, the ASI 432 may include all or a subset of the ASI of the plurality of different function records. For instance, the ASI 432 may include certain portions of the ASI of the plurality of different function records, while other portions of the ASI may be filtered or omitted from the ASI 432 in some examples. In other examples, the aggregation of the ASI of the plurality of different function records included in the ASI 432 may represent a concatenation of the ASI, such that the ASI 432 includes the information associated with each of the ASI in its unmodified form. In still other examples, the aggregation of the ASI within the ASI 432 may represent an averaging or other processing of one or more aspects (e.g., ratings) of the ASI.

The function record 420 includes one or more AAMs 434. The AAM(s) 434 included in the function record 420 may depend on the concept associated with the function record 420. In general, the AAM(s) 434 may cause a user device 102 to perform a function that is associated with the concept of the function record 420. Put another way, the AAM(s) 434 may cause a user device 102 to perform a function that is associated in some way with each of the multiple different function records used to generate the function record 420. As the following examples illustrate, the AAM(s) 434 can be different than any of the AAMs of the function records used to generate the function record 420. Accordingly, the AAM(s) 434 may cause a user device 102 to perform a function that is different than the functions performed by the AAMs of the multiple different function records used to generate the function record 420.

In one example, if the function ID 426 of the function record 420 is "Yelp—Italian cuisine," then the AAM(s) 434 may be configured to cause a user device 102 to launch the Yelp native application and generate a search for "Italian cuisine" in the Yelp native application. For example, the AAM(s) 434 may cause the user device 102 to perform a search within Yelp using the string "Italian cuisine" as a search query. Alternatively, the AAM(s) 434 may cause the user device 102 to access a category within Yelp that corresponds to the string "Italian cuisine." In another example, if the function ID 426 of the function record 420 is "IMDB—Martin Scorsese," then the AAM(s) 434 may cause a user device 102 to launch the IMDB native application and generate a search for "Martin Scorsese" in the IMDB native application. In this example, the AAM(s) 434 may cause the user device 102 to perform a search within IMDB using the string "Martin Scorsese" as a search query. Alternatively, the AAM(s) 434 may cause the user device 102 to access a category within IMDB that corresponds to the string "Martin Scorsese."

In some examples, the function record 420 may include one or more WAMs. In these examples, each of the WAM(s) (e.g., a URL) included in the function record 420 may be used by a web browser of a user device 102 to access a web resource that includes similar information and/or performs similar functions as would be performed by a native application that receives the AAM(s) 434 of the function record 420, as described herein. As one example, the WAM(s) included in the function record 420 may be generated using one or more WAMs included in the multiple different function records used to generate the function record 420. As another example, the WAM(s) included in the function record 420 may be generated using the AAMs included in the multiple different function records used to generate the function record 420.

In other examples, the function record 420 may include one or more application download addresses that can be used by a user device 102 to download the native application referenced in the AAM(s) 434 in the event that the native application is not installed on the user device 102. In these examples, the one or more application download addresses included in the function record 420 may be retrieved from the multiple different function records used to generate the function record 420.

FIGS. 14B-14C show the two example function records 422, 424 that the search system 100 generated based on multiple different function records included in the data store 108. The function record 422 of FIG. 14B was generated from multiple different function records that each include the concept "Yelp—Coffee." Accordingly, the function ID 428 of the function record 422 is "Yelp—Coffee." The multiple function records used to generate the function record 422 may be for entries in Yelp for establishments that sell coffee, such as Starbucks stores (e.g., the function record 402 of FIG. 13B), "McDonald's®" restaurants by McDonald's Corporation (hereinafter, "McDonald's"), and "Dunkin' Donuts®" restaurants by DD IP Holder LLC (hereinafter, "Dunkin' Donuts"), or other establishments. The ASI 436 may include the ASI from the multiple different function records that include the concept "Yelp—Coffee." The AAM(s) 438 may cause the user device 102 to launch the Yelp native application and perform a function associated with the concept "Yelp—Coffee." For example, the AAM(s) 438 may cause the user device 102 to perform a search for "Coffee" in the Yelp native application. As one example, the AAM(s) 438 may cause the user device 102 to perform a search within Yelp using the string "Coffee" as a search query. As another example, the AAM(s) 438 may cause the user device 102 to access a category that corresponds to the string "Coffee" within Yelp.

The function record 424 of FIG. 14C was generated from multiple different function records that each include the concept "Yelp—Breakfast." Accordingly, the function ID 430 of the function record 424 is "Yelp—Breakfast." The multiple function records may include entries in Yelp for establishments that sell breakfast, such as Starbucks stores (e.g., the application record 402 of FIG. 13B), "Perkins®" restaurants by Perkins & Marie Callender's, LLC (hereinafter, "Perkins"), "Village Inn®" restaurants by American Blue Ribbon Holdings, LLC (hereinafter, "Village Inn"), "McDonald's®" restaurants, "IHOP®" restaurants by IHOP IP, LLC (hereinafter, "IHOP"), or other establishments. The ASI 440 may include the ASI from the multiple different function records that include the concept "Yelp—Breakfast." The AAM(s) 442 may cause the user device 102 to launch the Yelp native application and perform a function associated with the concept "Yelp—Breakfast." For example, the AAM(s) 442 may cause the user device 102 to perform a search for "Breakfast" in the Yelp native application. As one example, the AAM(s) 442 may cause the user device 102 to perform a search within Yelp using the string "Breakfast" as a search query. As another example, the AAM(s) 442 may cause the user device 102 to access a category that corresponds to the string "Breakfast" within Yelp.

In other examples, the function record 422 of FIG. 14B may be generated using multiple different function records that each include the concept "Coffee." In these examples, the function ID 428 of the function record 422 may be "Coffee." The multiple function records used to generate the function record 422 may reference entries in one or more native applications (e.g., Yelp. TripAdvisor, Urbanspoon, and/or OpenTable) for establishments that sell coffee, such as Starbucks stores (e.g., the function record 402 of FIG. 13B), McDonald's restaurants, Dunkin' Donuts restaurants, or other establishments. The ASI 436 of the function record 422 may include ASI from the multiple different function records that include the concept "Coffee." The AAM(s) 438 of the function record 422 may cause the user device 102 to launch a native application (e.g., Yelp, TripAdvisor, Urbanspoon, and/or OpenTable) and perform a function associated with the concept "Coffee." For example, the AAM(s) 438 may cause the user device 102 to perform a search for "Coffee" in the native application.

In a similar manner as described above, in other examples, the function record 424 of FIG. 14C may be generated using multiple different function records that each include the concept "Breakfast." In this example, the function ID 430 of the function record 424 may be "Breakfast." The multiple function records may include entries in one or more native applications for establishments that sell breakfast, such as Starbucks stores (e.g., the application record 402 of FIG. 13B), Perkins restaurants, Village Inn restaurants, McDonald's restaurants, IHOP restaurants, or other establishments. The ASI 440 of the function record 424 may include ASI from the multiple different function records that include the concept "Breakfast." The AAM(s) 442 of the function record 424 may cause the user device 102 to launch a native application and perform a function associated with the concept "Breakfast." For example, the AAM(s) 442 may cause the user device 102 to perform a search for "Breakfast" within the native application.

In some examples, one or more of the function records 420, 422, and 424 may each include data (e.g., within a field) that indicates how many already existing function records were used to generate the respective one of the function records 420, 422, and 424.

Figure 15:
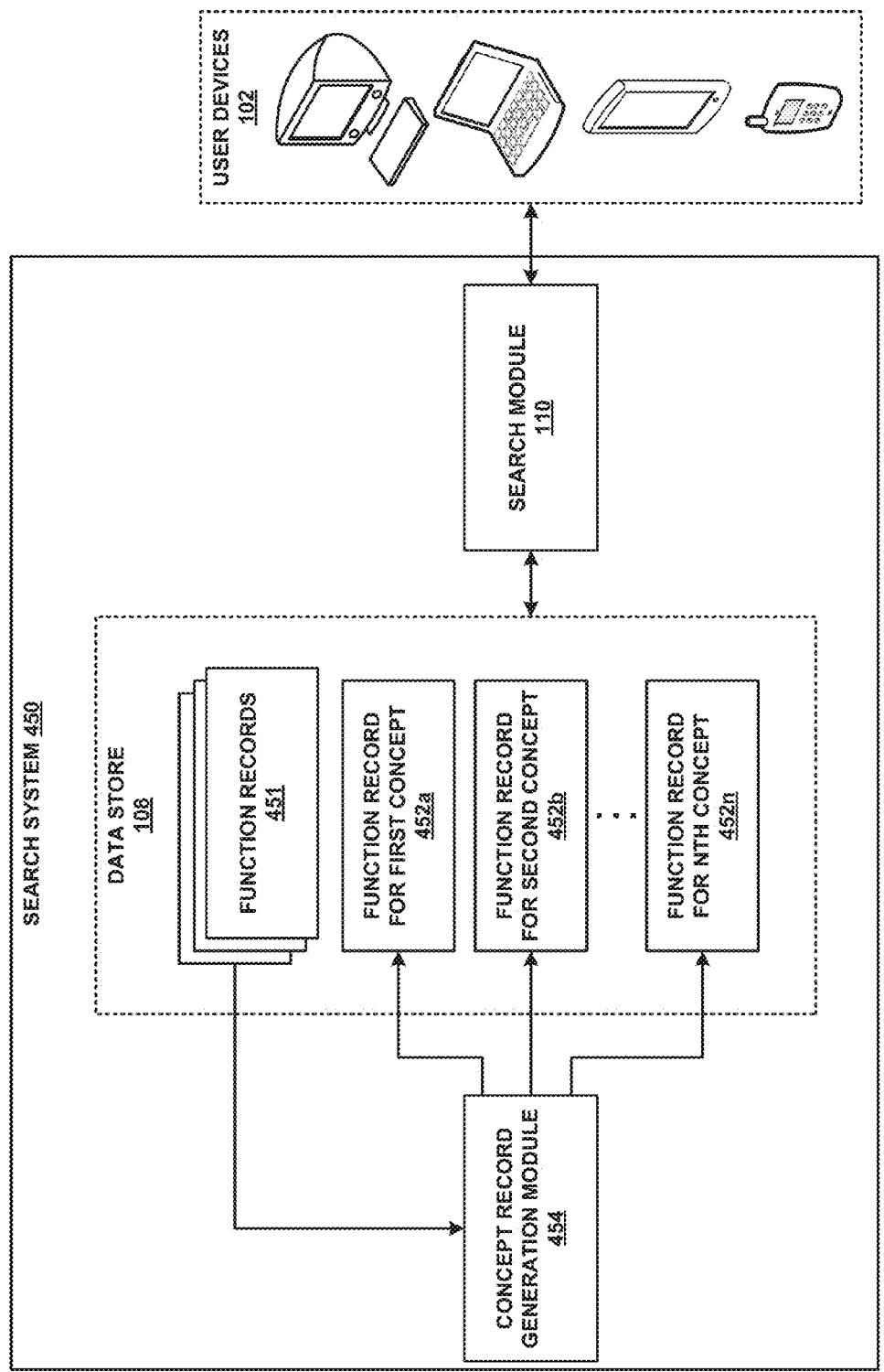
FIG. 15 is a functional block diagram of an example search system that generates new function records based on concepts included in previously existing function records.

FIG. 15 shows a functional block diagram of an example search system 450. The search system 450 includes the data store 108 and the search module 110, as described above. The data store 108 includes function records 451, which may represent any of the function records described above. Some of the function records 451 include concept fields having one or more concepts. The data store 108 also includes function records 452a, 452b, . . . , 452-N (collectively, the "new function records 452") that were generated based on the already existing function records 451.

The search system 450 includes a concept record generation module 454 (hereinafter, the "record generation module 454"). The record generation module 454 generates the new function records 452 based on concepts included in the already existing function records 451. For example, the record generation module 454 may generate a new function record 452 for a concept included in multiple existing function records 451. The function records 451 may include N or more different concepts. As illustrated in FIG. 15, the record generation module 454 generates N function records 452 from the N or more different concepts included in the function records 451.

The record generation module 454 can generate a function record in the following manner. Initially, the record generation module 454 may identify a concept included in the function records 451 (e.g., in a specific one of the function records 451). The record generation module 454 may then generate a new function record 452 for the identified concept. For example, the new function record 452 may have a function ID that includes the identified concept. The record generation module 454 may then populate the newly generated function record 452 (e.g., the ASI of the new function record 452) with the ASI of the function record 451 in which the concept was identified. The record generation module 454 may then select another function record 451 having the same concept and include the ASI from the selected function record 451 in the ASI of the newly generated function record 452. Accordingly, at this point in time, the newly generated function record 452 may include ASI from two different function records 451 each having the same concept. The record generation module 454 may then continue to add ASI to the newly generate function record 452. For example, the record generation module 454 may identify additional function records 451 having the same concept and include the ASI from the additional function records 451 in the ASI of the newly generated function record 452. In this manner, the newly generated function record 452 is populated with ASI from multiple different ones of the function records 451 each having the same concept. In FIG. 15, the record generation module 454 generates N function records 452 based on N different concepts included in the function records 451.

The record generation module 454 then generates AAMs for the newly generated function records 452. As described above, the AAMs may be configured to cause a user device 102 to launch a native application and perform functions associated with the concept upon which the function record 452 is based. For example, the record generation module 454 may generate an AAM that performs a search for the concept in a native application. In some examples, the AAM for the newly generated function record 452 may be generated by a human operator and added to the newly generated function record 452 by the record generation module 454.

In examples where a newly generated function record 452 was generated from already existing function records 451 including location data, the newly generated function record 452 may include the location data from each of the function records 451 used to generate the newly generated function record 452. For example, if three already existing function records 451 used to generate a new function record 452 each have location data that defines a distinct geographic area associated with the respective function record, the record generation module 454 may generate the new function record 452 to include the location data that defines the three distinct geographic areas.

In some examples, the record generation module 454 may update a previously generated new function record 452, e.g., in instances where information included in one or more already existing function records 451 used to generate the new function record 452 is also updated. For example, the record generation module 454 may update ASI of the new function record 452 with updated ASI of one or more of the function records 451. The record generation module 454 may also update one or more AAMs of the newly generated function record 452 based on the updated ASI of the one or more of the function records 451.

Figure 16:
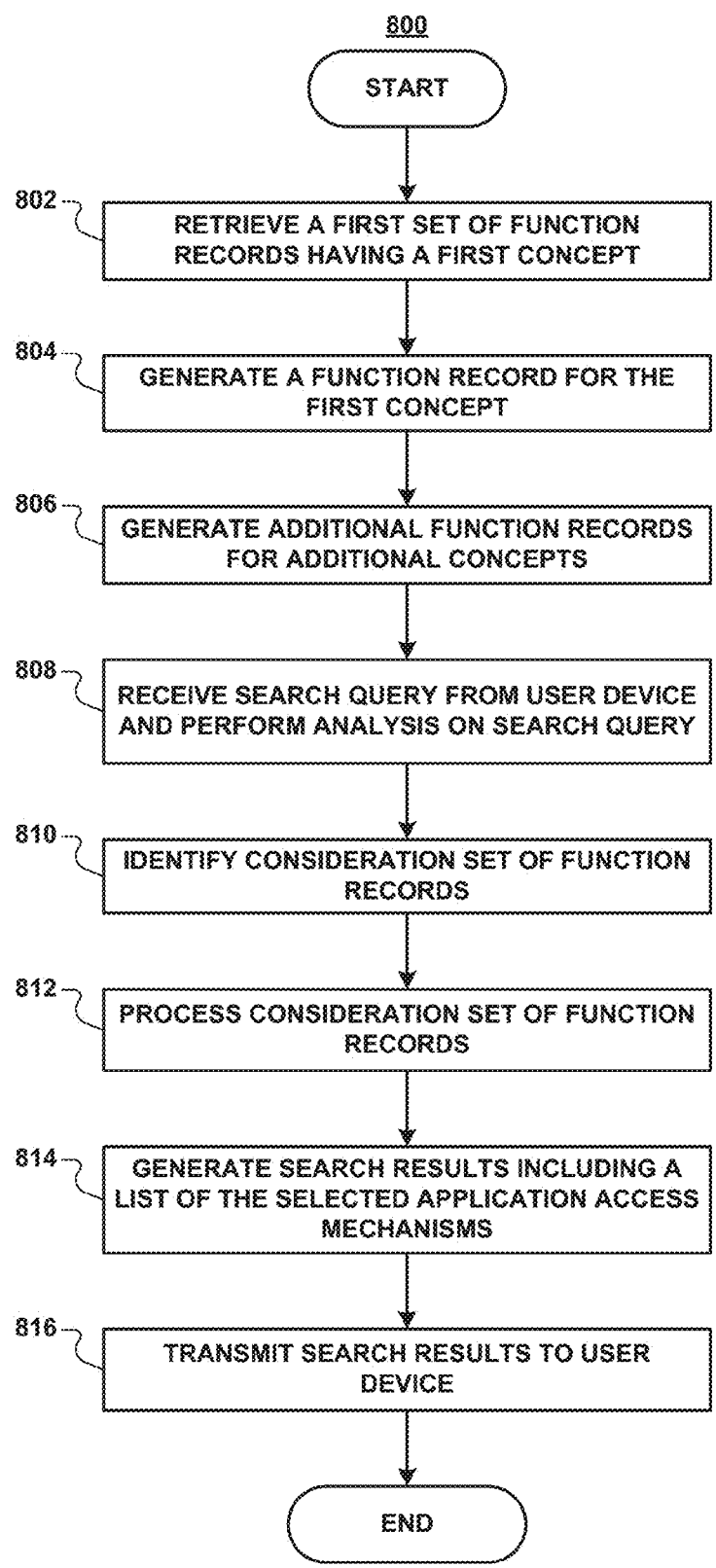
FIG. 16 is a flow diagram of a method for generating new function records based on concepts included in previously existing function records.

FIG. 16 shows a method 800 for generating new function records based on concepts included in already existing function records. The method 800 is described with respect to the search system 450 of FIG. 15 and the search module 110 of FIGS. 3 and 15. It may be assumed that at the start of the method 800, the data store 108 includes a plurality of function records having multiple different concepts.

In block 802, the record generation module 454 retrieves a first set (e.g., a subset) of the function records 451, each function record of the first set having a first concept. In block 804, the record generation module 454 generates a new function record for the first concept 452a. For example, the record generation module 454 may generate the new function record 452a to have a function ID named after the first concept. The record generation module 454 may also generate an ASI field in the new function record 452a that includes the ASI from each of the functional records in the first set of the function records 451. The record generation module 454 may then generate one or more access mechanisms (e.g., an AAM, a WAM, and/or an application download address) for the newly generated function record 452a. In block 806, the record generation module 454 generates one or more additional function records (e.g., one or more of the new function records 452b . . . 452-N) for one or more additional concepts included in the function records 451, e.g., in other sets (e.g., subsets) of the function records 451. For example, the record generation module 454 may generate a new function record 452 for each concept identified in the already existing function records 451.

In block 808, the query analysis module 122 receives a search query 128 generated by a user device 102 and then analyzes the search query 128. In block 810, the set generation module 124 identifies a consideration set of function records based on the search query 128. The consideration set may include one or more function records from the original function records 451 and one or more newly generated function records 452. In block 812, the set processing module 126 processes (e.g., scores) the consideration set of function records. In block 814, the set processing module 126 selects one or more function records from the consideration set, selects one or more AAMs from the selected function records, and generates search results including a list of the selected AAMs. In block 816, the set processing module 126 transmits the search results to the user device 102 that generated the search query 128.

Modules and data stores included in the search systems 100, 450 represent features that may be included in the search systems 100, 450 of the present disclosure. For example, the search module 110, the record generation module 454, and the data store 108 may represent features included in the search systems 100, 450. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In other implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the memory components and the I/O components. For example, the one or more processing units may be configured to communicate with the memory components and the I/O components via the interconnect components.

A memory component, or memory, may include any volatile or non-volatile media. For example, a memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

The memory components may include (e.g., store) data described herein. For example, the memory components may include the data included in the function records of the data store 108. The memory components may also include instructions that may be executed by one or more processing units. For example, the memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In other examples, the I/O components may include hardware and software that is configured to communicate with additional devices, such as external memory (e.g., external HDDs).

In some implementations, the search systems 100, 450 may be systems of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search systems 100, 450 may also include various human interface devices, including, but not limited to, display screens, keyboards, pointing devices (e.g., a mouse), touchscreens, speakers, and microphones. The one or more computing devices may also be configured to communicate with additional devices, such as external memory (e.g., external HDDs).

The one or more computing devices of the search systems 100, 450 may be configured to communicate with the network 106. The one or more computing devices of the search systems 100, 450 may also be configured to communicate with one another via a computer network. In some examples, the one or more computing devices of the search systems 100, 450 may include one or more server computing devices configured to communicate with the user devices 102 (e.g., receive search queries and transmit search results), gather data from the data sources 104, index the data, store the data, and store other documents. The one or more computing devices may reside within a single machine at a single geographic location in some examples. In other examples, the one or more computing devices may reside within multiple machines at a single geographic location. In still other examples, the one or more computing devices may be distributed across a number of geographic locations.

What is claimed is:

1. A method comprising:
   selecting, by a computing device, function records, each function record including an application access mechanism, application state information, and a concept name, wherein the application access mechanism references a native application and indicates one or more operations for the native application to perform, wherein the application state information describes a state of the native application after the native application has performed the one or more operations, wherein the concept name describes a concept associated with the application state information, and wherein selecting the function records comprises selecting function records that have the same concept name;

aggregating, by the computing device, the application state information included in the selected function records;

generating, by the computing device, a new function record that includes new application state information comprising the aggregated application state information;

generating, by the computing device, a new application access mechanism for the new function record that is different than the application access mechanisms included in the selected function records;

receiving, at the computing device, a search query from a user device;

identifying, by the computing device, the new function record using the search query;

selecting, by the computing device, the new application access mechanism from the new function record; and transmitting, by the computing device, the new application access mechanism to the user device.

2. The method of claim 1, wherein identifying the new function record using the search query comprises identifying the new function record based on matches between terms of the search query and terms of the aggregated application state information included in the new function record.

3. The method of claim 1, further comprising storing, by the computing device, the new function record in a data store that includes a plurality of function records including the selected function records, wherein identifying the new function record using the search query comprises performing a search of the data store using the search query.

4. The method of claim 3, further comprising:
identifying, by the computing device, one or more of the plurality of function records using the search query;
selecting, by the computing device, one or more application access mechanisms from the identified one or more of the plurality of function records; and
transmitting, by the computing device, the selected one or more application access mechanisms to the user device along with the new application access mechanism.

5. The method of claim 1, wherein the new application access mechanism references a native application and indicates one or more operations for the native application to perform, and wherein performance of the one or more operations causes the native application to perform a search within the native application using the concept name.

6. The method of claim 1, wherein the new application access mechanism references a native application and indicates one or more operations for the native application to perform, and wherein performance of the one or more operations causes the native application to access a category within the native application that corresponds to the concept name.

7. The method of claim 1, wherein the new application access mechanism references a native application and indicates one or more operations for the native application to perform, wherein the application access mechanisms included in the selected function records reference different native applications, and wherein the native application referenced by the new application access mechanism comprises one of a native application referenced by the application access mechanisms included in the selected function records and another native application.

8. The method of claim 1, wherein the new application access mechanism references a native application and indicates one or more operations for the native application to perform, wherein the application access mechanisms included in the selected function records each reference the same native application, and wherein the native application referenced by the new application access mechanism comprises the same native application.

9. The method of claim 1, wherein each of the selected function records further includes location data that indicates a geographic area associated with the respective function record, the method further comprising:
aggregating, by the computing device, the location data included in the selected function records; and
generating, by the computing device, new location data for the new function record, wherein the new location data comprises the aggregated location data.

10. The method of claim 9, wherein identifying the new function record using the search query comprises identifying the new function record based on the aggregated location data included in the new function record.

11. A system comprising one or more computing devices configured to:
select function records, each function record including an application access mechanism, application state information, and a concept name, wherein the application access mechanism references a native application and indicates one or more operations for the native application to perform, wherein the application state information describes a state of the native application after the native application has performed the one or more operations, wherein the concept name describes a concept associated with the application state information, and wherein to select the function records, the one or more computing devices are configured to select function records that have the same concept name;
aggregate the application state information included in the selected function records;
generate a new function record that includes new application state information comprising the aggregated application state information;
generate a new application access mechanism for the new function record that is different than the application access mechanisms included in the selected function records;
receive a search query from a user device;
identify the new function record using the search query;
select the new application access mechanism from the new function record; and
transmit the new application access mechanism to the user device.

12. The system of claim 11, wherein the one or more computing devices are further configured to store the new function record in a data store that includes a plurality of function records including the selected function records, and wherein to identify the new function record using the search query, the one or more computing devices are configured to perform a search of the data store using the search query.

13. The system of claim 12, wherein the one or more computing devices are further configured to:
identify one or more of the plurality of function records using the search query;

select one or more application access mechanisms from the identified one or more of the plurality of function records; and transmit the selected one or more application access mechanisms to the user device along with the new application access mechanism.

14. The system of claim 11, wherein the new application access mechanism references a native application and indicates one or more operations for the native application to perform, and wherein performance of the one or more operations causes the native application to perform a search within the native application using the concept name.

15. The system of claim 11, wherein the new application access mechanism references a native application and indicates one or more operations for the native application to perform, and wherein performance of the one or more operations causes the native application to access a category within the native application that corresponds to the concept name.

16. The system of claim 11, wherein the new application access mechanism references a native application and indicates one or more operations for the native application to perform, wherein the application access mechanisms included in the selected function records reference different native applications, and wherein the native application referenced by the new application access mechanism comprises one of a native application referenced by the application access mechanisms included in the selected function records and another native application.

17. The system of claim 11, wherein the new application access mechanism references a native application and indicates one or more operations for the native application to perform, wherein the application access mechanisms included in the selected function records each reference the same native application, and wherein the native application referenced by the new application access mechanism comprises the same native application.

18. The system of claim 11, wherein each of the selected function records further includes location data that indicates a geographic area associated with the respective function record, and wherein the one or more computing devices are further configured to:

aggregate the location data included in the selected function records; and generate new location data for the new function record, wherein the new location data comprises the aggregated location data.

19. The system of claim 18, wherein to identify the new function record using the search query, the one or more computing devices are configured to identify the new function record based on the aggregated location data included in the new function record.

20. A non-transitory computer-readable storage medium comprising instructions that cause one or more computing devices to:

select function records, each function record including an application access mechanism, application state information, and a concept name, wherein the application access mechanism references a native application and indicates one or more operations for the native application to perform, wherein the application state information describes a state of the native application after the native application has performed the one or more operations, wherein the concept name describes a concept associated with the application state information, and wherein the instructions that cause the one or more computing devices to select the function records comprise instructions that cause the one or more computing devices to select function records that have the same concept name;

aggregate the application state information included in the selected function records;

generate a new function record that includes new application state information comprising the aggregated application state information;

generate a new application access mechanism for the new function record that is different than the application access mechanisms included in the selected function records;

receive a search query from a user device;

identify the new function record using the search query;

select the new application access mechanism from the new function record; and transmit the new application access mechanism to the user device.

* * * * *